US012656172B2

(12) United States Patent
Chen

(10) Patent No.: US 12,656,172 B2
(45) Date of Patent: Jun. 16, 2026

(54) ABNORMAL SOUND DETECTION IN A MECHANIZED ENVIRONMENT

(71) Applicant: Micron Technology, Inc., Boise, ID (US)

(72) Inventor: Ming Chen, Singapore (SG)

(73) Assignee: Micron Technology, Inc., Bosie, ID (US)

( * ) Notice: Subject to any disclaimer, the term of this patent is extended or adjusted under 35 U.S.C. 154(b) by 195 days.

(21) Appl. No.: 18/539,086

(22) Filed: Dec. 13, 2023

(65) Prior Publication Data

US 2024/0201009 A1      Jun. 20, 2024

Related U.S. Application Data

(60) Provisional application No. 63/433,343, filed on Dec. 16, 2022.

(51) Int. Cl.
| | |
|---|---|
| *G01H 17/00* | (2006.01) |
| *G06F 16/432* | (2019.01) |
| *G06F 16/60* | (2019.01) |
| *G07C 3/00* | (2006.01) |
| G01N 29/14 | (2006.01) |
| G01N 29/44 | (2006.01) |
| G01N 29/46 | (2006.01) |

(52) U.S. Cl.
CPC ........... *G01H 17/00* (2013.01); *G06F 16/433* (2019.01); *G06F 16/60* (2019.01); *G07C 3/00* (2013.01); *G01N 29/14* (2013.01); *G01N*

*29/4427* (2013.01); *G01N 29/4436* (2013.01); *G01N 29/46* (2013.01); *G01N 2291/269* (2013.01)

(58) Field of Classification Search
CPC .......... G01H 17/00; G07C 3/00; G01N 29/14; G01N 29/4427; G01N 29/4436; G01N 29/46; G01N 2291/269
See application file for complete search history.

(56) References Cited

U.S. PATENT DOCUMENTS

| | | | | | |
|---|---|---|---|---|---|
| 9,584,946 | B1 * | 2/2017 | Lyren | ...................... | H02M 1/08 |
| 10,699,163 | B1 * | 6/2020 | Shah | ..................... | G06F 18/214 |
| 12,016,098 | B1 * | 6/2024 | Sieracki | ................. | H05B 47/12 |
| 2003/0112261 | A1 * | 6/2003 | Zhang | ................... | G11B 27/28 |
| 2014/0236585 | A1 * | 8/2014 | Subasingha | ............. | G10L 25/90 |
| | | | | | 704/207 |

(Continued)

*Primary Examiner* — Carolyn R Edwards

(74) *Attorney, Agent, or Firm* — Holland & Hart LLP

(57) ABSTRACT

Methods, systems, and devices for abnormal sound detection are described. An audio recording of a mechanized environment may be obtained. First sounds extracted from the audio recording may be categorized into a set of categorical sounds. A library of first sound patterns may be generated using the categorical sound and based on second sounds extracted from the audio recording. The first sound patterns may include sequences of the categorical sounds. Audio data including audio signals capture by sensors in the mechanized environment may be received, and second sound patterns detected in the audio signals may be compared with the first sound patterns. Based on comparing the second sound patterns with the first sounds patterns, a sound pattern that is not in the library of the first sound patterns may be identified. An alarm may be generated based on detecting the sound pattern a threshold quantity of times.

20 Claims, 12 Drawing Sheets

(56)          References Cited

U.S. PATENT DOCUMENTS

| | | | |
|---|---|---|---|
| 2016/0217124 A1* | 7/2016 | Sarikaya | G06F 40/279 |
| 2018/0074162 A1* | 3/2018 | Jones | G06Q 10/08 |
| 2018/0180465 A1* | 6/2018 | Papanagiotou | G06F 11/3058 |
| 2020/0273483 A1* | 8/2020 | Li | G10L 25/18 |
| 2020/0372371 A1* | 11/2020 | Sabanayagam | G06F 17/18 |
| 2023/0065647 A1* | 3/2023 | Foster | G08G 1/096725 |

* cited by examiner 300-1

300-2

305

505-6

500

600-1 ⟍

600-2 ⟍

600-3 ⟍

600

700-a
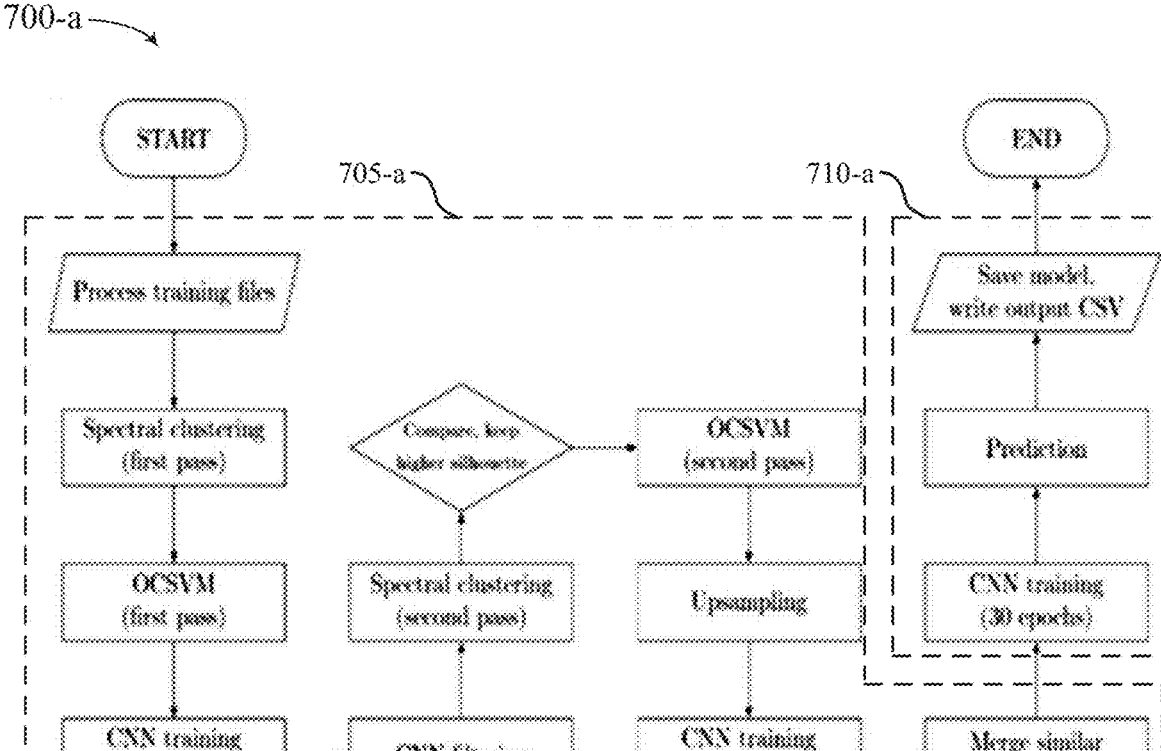
FIG. 7A
701-b
702-c
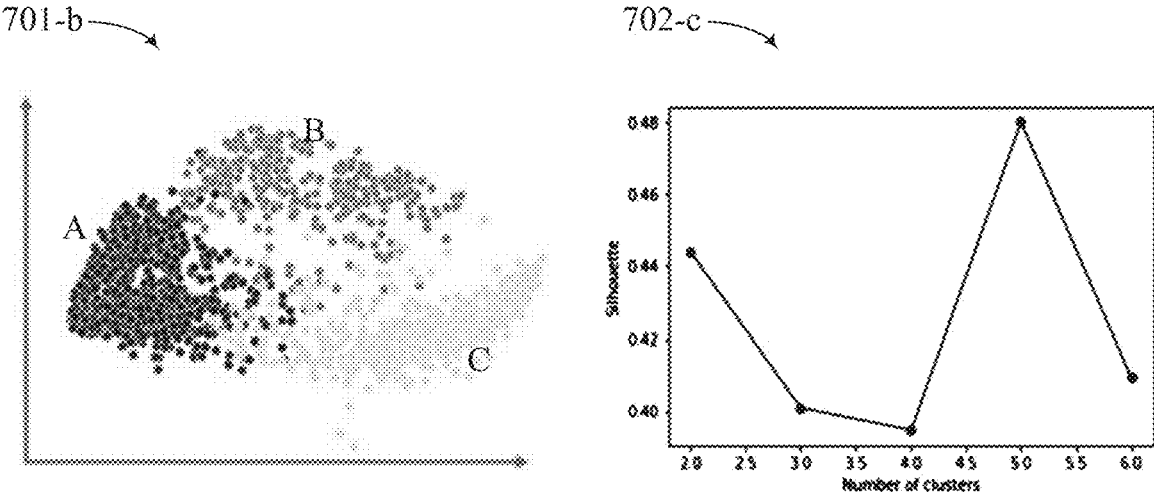
FIG. 7B                                    FIG. 7C 1005 — Engineer Features 1010 — Categorize Sounds 1015 — Generate Library Of Sound Patterns 1020 — Compare Detected Sound Patterns With Library Of Sound Patterns 1025 — Send Alert(s)

1000

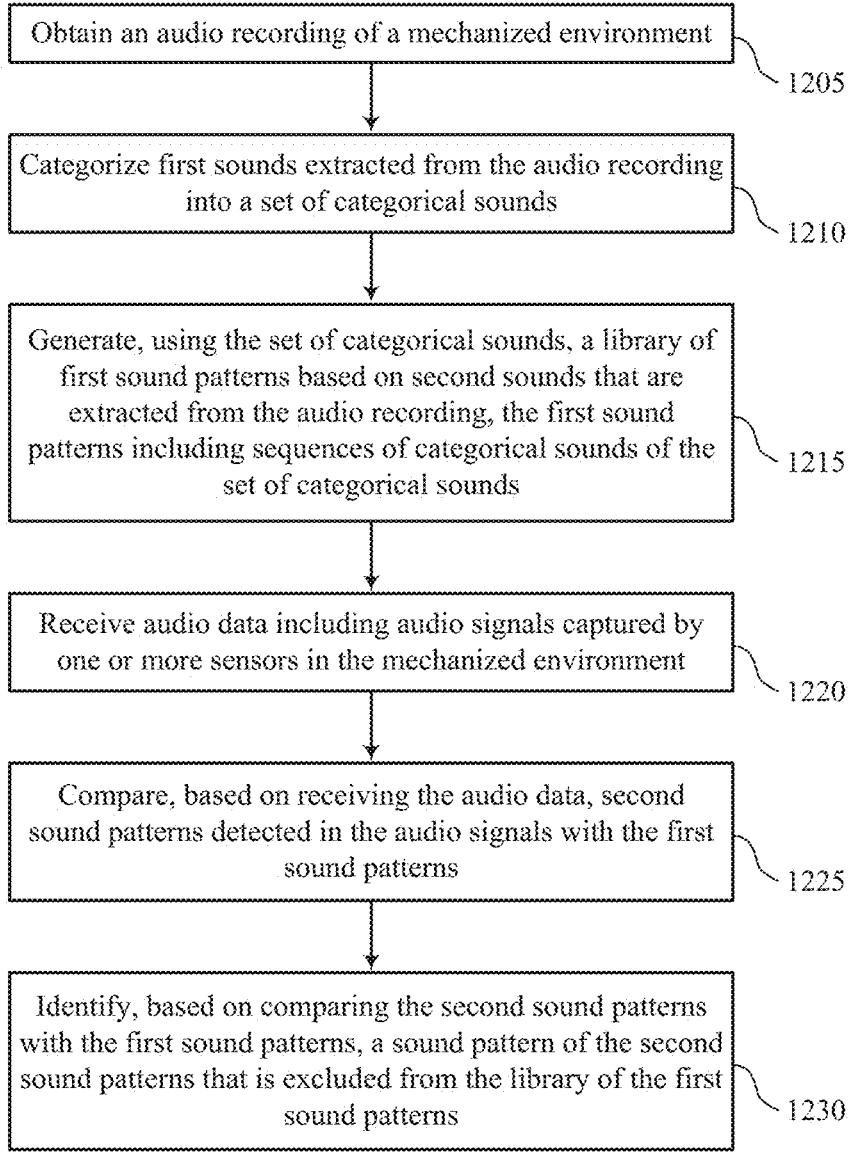

Obtain an audio recording of a mechanized environment

1205

Categorize first sounds extracted from the audio recording into a set of categorical sounds

1210

Generate, using the set of categorical sounds, a library of first sound patterns based on second sounds that are extracted from the audio recording, the first sound patterns including sequences of categorical sounds of the set of categorical sounds

1215

Receive audio data including audio signals captured by one or more sensors in the mechanized environment

1220

Compare, based on receiving the audio data, second sound patterns detected in the audio signals with the first sound patterns

1225

Identify, based on comparing the second sound patterns with the first sound patterns, a sound pattern of the second sound patterns that is excluded from the library of the first sound patterns

ABNORMAL SOUND DETECTION IN A MECHANIZED ENVIRONMENT

CROSS REFERENCE

The present Application for Patent claims priority to U.S. Patent Application No. 63/433,343 by Chen, entitled "ABNORMAL SOUND DETECTION IN A MECHANIZED ENVIRONMENT," filed Dec. 16, 2022, which is assigned to the assignee hereof, and which is expressly incorporated by reference in its entirety herein.

TECHNICAL FIELD

The following relates to one or more systems for failure detection, including abnormal sound detection in a mechanized environment.

BACKGROUND

A mechanized environment (such as a manufacturing floor, an engine, a motor, a vehicle, etc.) may include many parts that are subject to failure over time. To maintain a smooth functioning of the mechanized environment, it may be desired to replace parts as close to the end of their operating life as possible but before a loss in function and/or failure. However, due to the indeterminate nature of such failures, it may be difficult to predict when a part is failing. Accordingly, parts may be replaced early (which may increase a cost of operation) or may fail unexpectedly (which may disrupt operation). In some examples, the noise emitted by the mechanized environment may be indicative of a failure or upcoming failure of one or more parts. Many sensors may be distributed throughout a mechanized environment to monitor different aspects of the mechanized environment (e.g., thermal aspects, auditory aspects, visual aspects, etc.). In some examples, auditory sensors may be used to capture noises in a machine environment.

BRIEF DESCRIPTION OF THE DRAWINGS

FIGS. 7A through 7C illustrate aspects of sound categorization that supports abnormal sound detection in a mechanized environment in accordance with examples as disclosed herein.

FIG. 12 illustrates a flowchart showing a method or methods that support abnormal sound detection in a mechanized environment in accordance with examples as disclosed herein.

DETAILED DESCRIPTION

In a mechanized environment (e.g., an engine, a motor, a manufacturing floor, etc.), certain sounds (e.g., abnormal sounds, which may also be referred to as out-of-the-ordinary sounds, novel sounds, etc.) may indicate an issue in the mechanized environment or predict a forthcoming issue in the mechanized environment. For example, an abnormal sound may indicate that a device or part of a device has failed or that failure of a device or part is imminent (e.g., within minutes, hours, days, weeks, etc.). That said, many sounds may be present in a mechanized environment. Moreover, different mechanized environments may include different collections and combinations of sounds. Thus, processing all of the different sounds to isolate critical sounds may be a data and processing intensive process and may involve human intervention (e.g., to physically identify and catalogue the critical sounds).

In some examples, unsupervised machine learning techniques are used to develop acoustic models that are able detect issues in a mechanized environment without human-labeling of the sounds. However, such acoustic models may be specific to particular mechanized environments (e.g., particular areas and tool types) and may be difficult (or impossible) to adapt to other mechanized environments. Thus, techniques and configurations for detecting abnormal sounds in mechanized environments that are adapted (e.g., with minimal or no effort) across multiple mechanized environments may be desired.

To implement adaptable techniques and configurations for detecting abnormal sounds in a mechanized environment, machine learning techniques may be combined with natural language processing techniques. In such cases, machine learning techniques may be used to detect and classify sounds in the mechanized environment without human intervention, and natural language processing techniques may use the classified sounds to build a library of sound patterns and to detect sound patterns that are not included in the library.

In addition to applicability in memory systems as described herein, techniques for abnormal sound detection in a mechanized environment may be generally implemented to improve the sustainability of various electronic devices and systems. As the use of electronic devices has become even more widespread, the quantity of energy used and challenges of manufacturing environments has increased. Implementing the techniques described herein may improve the impact related to electronic devices by improving the detection of abnormal sounds in a mechanized environment, which may allow for more flexible and widespread detection and result in the life of electronic devices and avoiding catastrophic problems, among other benefits.

Figure 1:
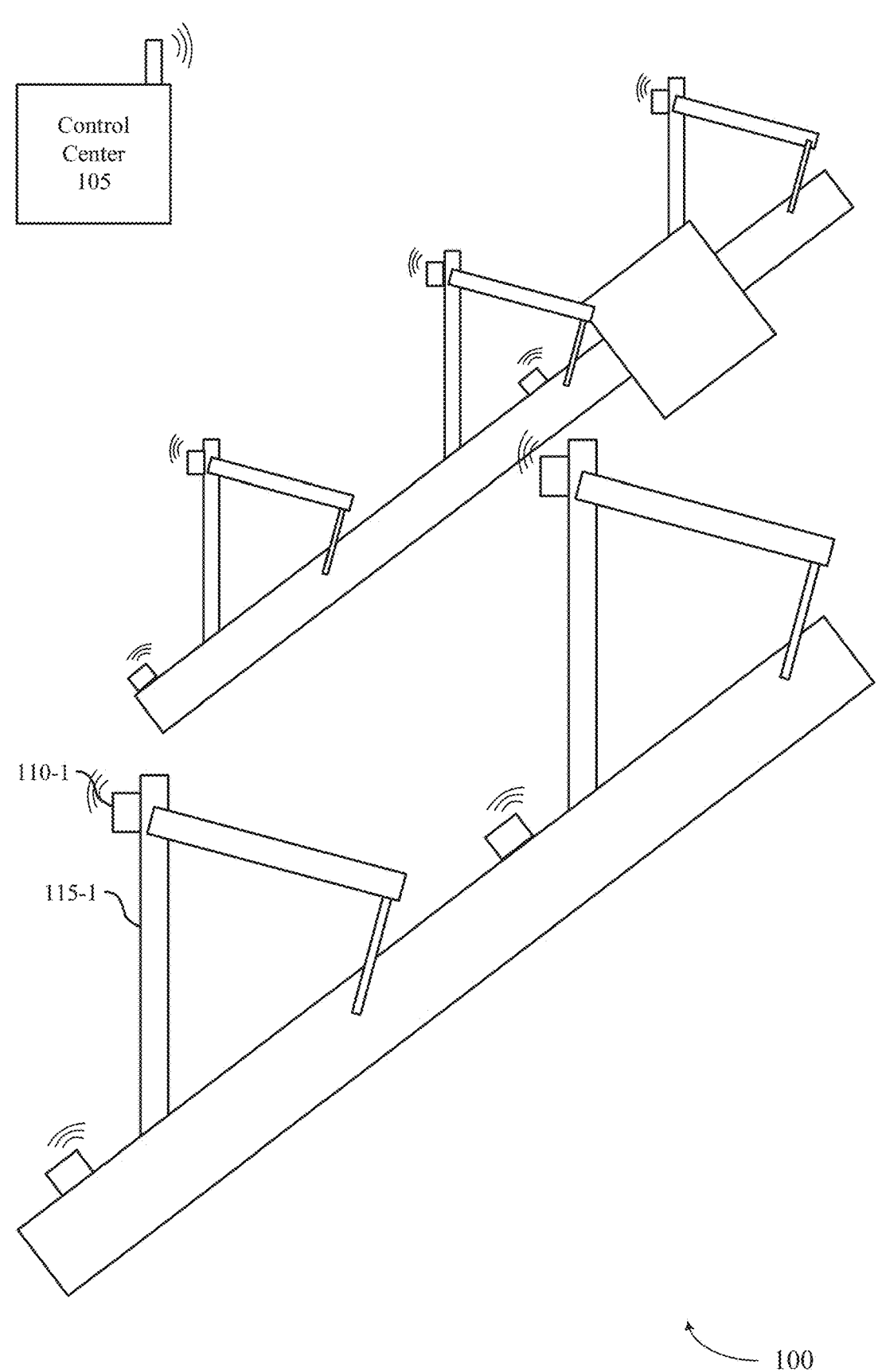
FIG. 1 illustrates an example of a mechanized environment that supports abnormal sound detection in a mechanized environment in accordance with examples as disclosed herein.

FIG. 1 illustrates an example of a mechanized environment that supports abnormal sound detection in a mechanized environment in accordance with examples as disclosed herein.

The mechanized environment 100 may include a control center 105, sensors (e.g., first sensor 110-1) robotic elements (e.g., first robotic element 115-1), conveyances (e.g., conveyor belts, wheeled surfaces, etc.), among many additional components. The control center 105 may be configured to maintain and monitor an operation of the mechanized environment 100. As part of maintaining and monitoring the mechanized environment 100, the control center 105 may receive signaling from the sensors in the mechanized environment 100. The signaling may include audio signals, video signals, thermal signature signals, temperature signals, and the like. In some examples, the control center 105 may be connected to the sensors via wireless connections, wired connections, or both. The robotic elements in the mechanized environment 100 may be used to perform specific tasks, such as moving, placing, heating, and cleaning parts, among other tasks. In some examples, the mechanized environment 100 is a semiconductor manufacturing environment—e.g., used to manufacture memory dies, processing dies, etc.

In the mechanized environment 100 (e.g., including an engine, a motor, a manufacturing floor, etc.), certain sounds (e.g., abnormal sounds, which may also be referred to as out-of-the-ordinary sounds, novel sounds, etc.) may indicate an issue in the mechanized environment 100 or predict a forthcoming issue in the mechanized environment 100 (e.g., unless corrective action is taken). For example, an abnormal sound may indicate that a device or part of a device has failed or that failure of a device or part is imminent (e.g., within hours, days, weeks, etc.). That said, many sounds may be present in the mechanized environment 100. Moreover, different mechanized environments may include different collections and combinations of sounds. Thus, processing all of the different sounds to isolate critical sounds may be a data and processing intensive process and may involve human intervention (e.g., to physically identify and catalogue the critical sounds).

In some examples, unsupervised machine learning techniques are used to develop acoustic models that are able detect issues in the mechanized environment 100 without human-labeling of the sounds. However, such acoustic models may be specific to particular mechanized environments (e.g., particular areas and tool types) and may be difficult (or impossible) to adapt to other mechanized environments. Thus, techniques and configurations for detecting abnormal sounds in mechanized environments that are adapted (e.g., with minimal or no effort) across multiple mechanized environments may be desired.

To implement adaptable techniques and configurations for detecting abnormal sounds in the mechanized environment 100, machine learning techniques may be combined with natural language processing techniques. In such cases, machine learning techniques may be used to detect and classify sounds in the mechanized environment 100 without human intervention, and natural language processing techniques may use the classified sounds to build a library of sound patterns and to detect sound patterns that are not included in the library. Such techniques and configurations may be adapted to many mechanized environments (e.g., simply by using the techniques and configurations implemented in the mechanized environment 100) based on the techniques supporting the autonomous detection and categorization of sounds, the autonomous construction of a sound pattern library, and the autonomous detection of abnormal sound patterns in the mechanized environment 100.

The adaptable techniques and configurations for detecting abnormal sounds in a mechanized environment may include feature engineering operations, unsupervised clustering operations, autonomous supervised classification operations, sound pattern detection operations, and abnormal sound pattern detection operations. The feature engineering operations are described in more detail herein, including with reference to FIGS. 3 through 6. The unsupervised clustering and labeling operations and the autonomous supervised classification operations are described in more detail herein, including with reference to FIGS. 7A through 7C. The sound pattern detection operations are described in more detail herein, including with reference to FIG. 8. And the abnormal sound pattern detection operations are described in more detail herein, including with reference to FIGS. 9A and 9B.

Although described in the context of a manufacturing environment, the techniques described herein may be similarly applied to other mechanized environments including electrical generators, electrical motors, mechanical engines, vehicles (e.g., terrestrial, nautical, aeronautical, astronautical, and the like).

Figure 2:
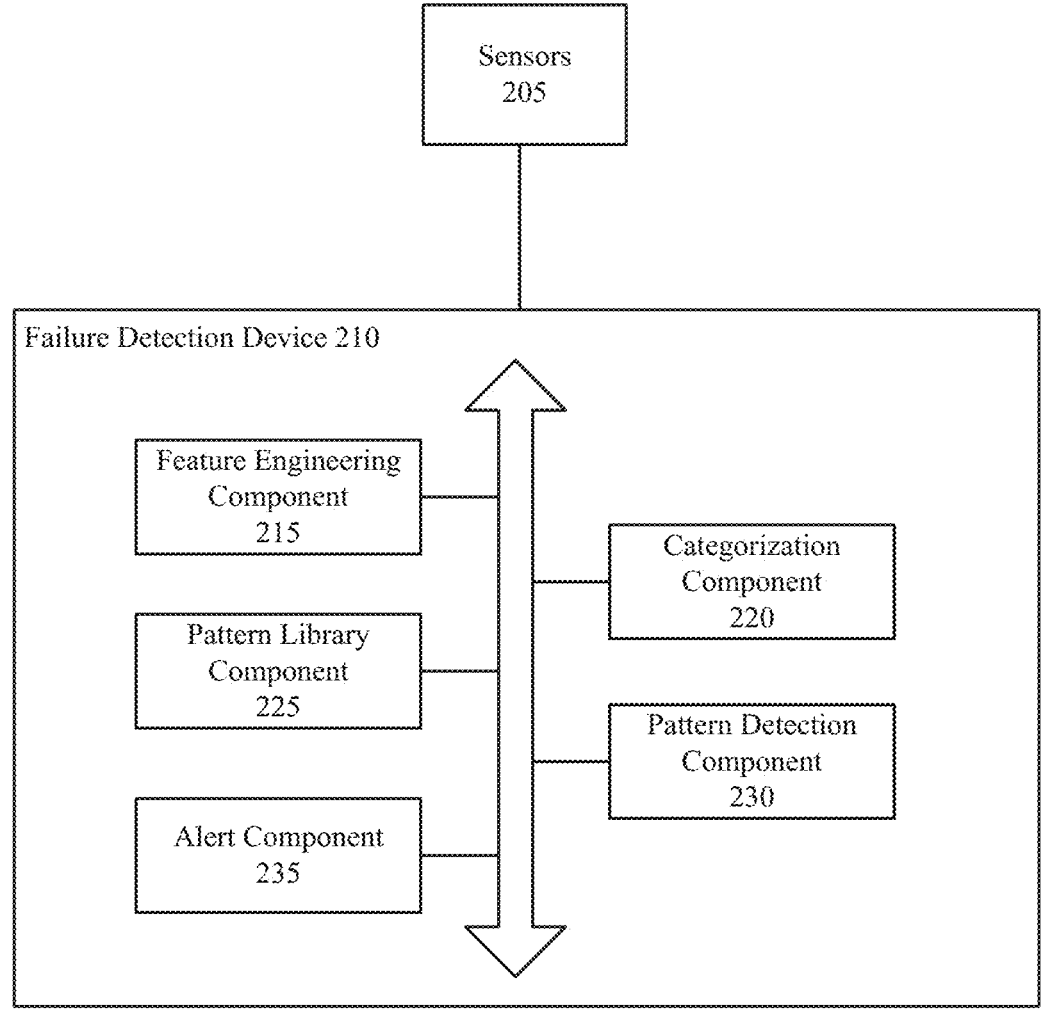
FIG. 2 illustrates aspects of a subsystem that supports abnormal sound detection in a mechanized environment in accordance with examples as disclosed herein.

FIG. 2 illustrates aspects of a subsystem that supports abnormal sound detection in a mechanized environment in accordance with examples as disclosed herein.

The subsystem 200 may include the sensors 205 and the failure detection device 210. The sensors 205 may be configured to capture environmental information (e.g., in the form of audio information, video information, thermal information, or any combination thereof. In some examples, the sensors 205 are microphones. The sensors 205 may be distributed across a mechanized environment. In some examples, the sensors 205 may be connected with a local area network—e.g., via a wired connection, a wireless connection, or both.

The failure detection device 210 may be configured to detect failures, impending failures, or both, in a mechanized environment using the environmental information captured by the sensors 205. The failure detection device 210 may include the feature engineering component 215, the categorization component 220, the pattern library component 225, the pattern detection component 230, and the alert component 235. In some examples, the components of the failure detection device 210 may be implemented at an on-premises device, in a cloud environment, or a combination thereof. For example, components associated with machine learning aspects, such as the categorization component 220 and the pattern library component 225, may be implemented in a cloud environment, while the other components may be implemented at an on-premises device, though other combinations are possible. The processing functions of the failure detection device 210 may be performed by a central processing unit (CPU), a graphics processing unit (GPU), or both. For example, the machine learning aspects may be performed by a GPU.

The feature engineering component 215 may be configured to identify sounds in an audio recording of the mechanized environment and to calculate spectral characteristics for the identified sounds. Feature engineering operations performed by the feature engineering component 215 are described in more detail herein, including with reference to FIGS. 3 through 6.

The categorization component 220 may be configured to cluster and classify identified sounds—e.g., by labeling sounds within particular clusters with corresponding identifiers. Categorization operations performed by the categorization component 220 are described in more detail herein, including with reference to FIGS. 7A through 7C.

The pattern library component 225 may be configured to construct a library of sound patterns of the categorized sounds—e.g., based on detecting unique sequences of the categorized sounds. Operations performed by the pattern library component 225 to construct a pattern library are described in more detail herein, including with reference to FIG. 8.

The pattern detection component 230 may be configured to compare detected sound patterns with sound patterns stored in the library of sound patterns. Sound patterns that are not included in the library of sound patterns may be referred to as "abnormal" sound patterns. In some examples, abnormal sound patterns that occur a threshold quantity of times may be identified as "critical" sound patterns. Operations performed by the pattern detection component 230 to detect sound patterns are described in more detail herein, including with reference to FIG. 9A.

The alert component 235 may be configured to generate an alert (e.g., a light indicator, an alarm, a noise indicator, etc.)—e.g., that an abnormal sound pattern has been detected, that a critical sound pattern has been detected, etc.

Figure 3:
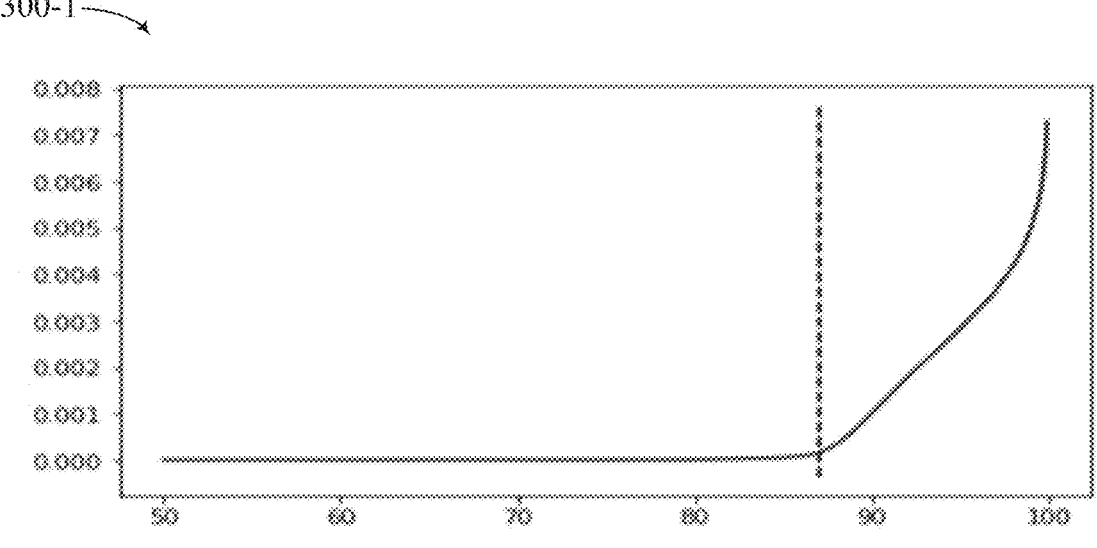
FIG. 3 illustrate aspects of feature engineering that supports abnormal sound detection in a mechanized environment in accordance with examples as disclosed herein.
Figure 3:
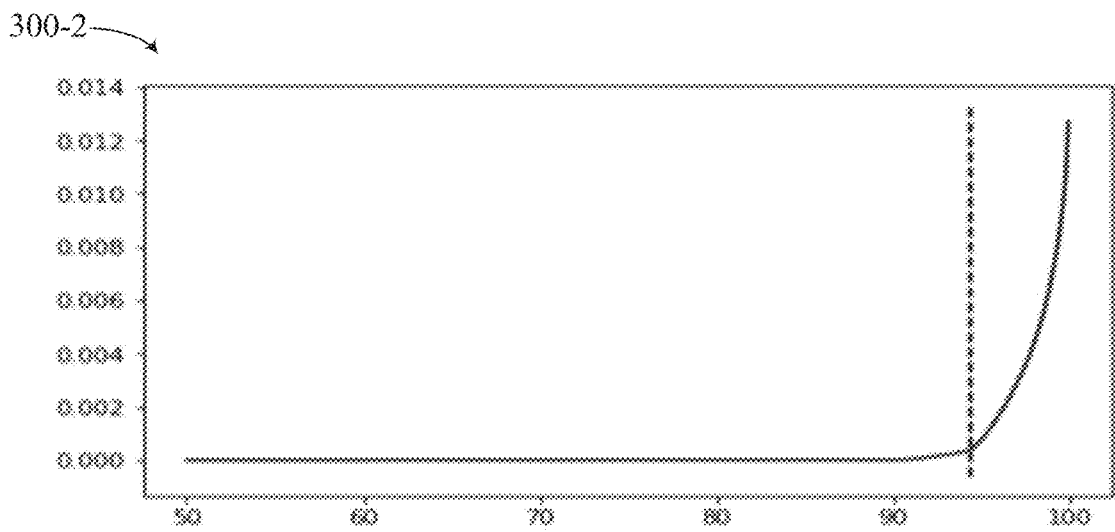
Figure 3:
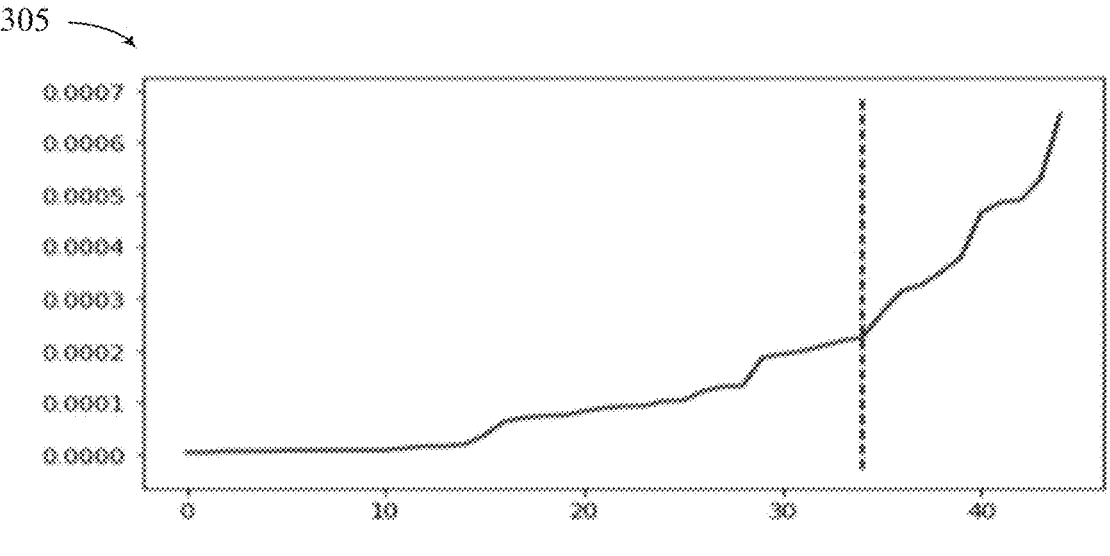

FIG. 3 illustrate aspects of feature engineering that supports abnormal sound detection in a mechanized environment in accordance with examples as disclosed herein.

Feature engineering may include signal detection and feature extraction (e.g., which may be performed by the feature engineering component 215 of FIG. 2). The signal detection may include signal filtering and envelope-based signal detection. The signal filtering may include applying a high-pass filter, a band stop filter, a broadband frequency filter, or any combination thereof, to received signals (e.g., to received recordings of sounds). In some examples, a sound recording may include one or more sounds and may be referred to as a sound file. Dynamically calculating the root mean square (RMS) noise threshold for various levels of background noise in different mechanized environments may be challenging, and interquartile range (IQR) based threshold methods may perform poorly in sparse recordings—e.g., for sound recordings where a significant portion of the sound recording is idle.

Accordingly, a noise threshold for detecting sounds in a mechanized environment may be determined. In some examples, an elbow-on-elbow technique may be used to identify the noise threshold. The percentile plots 300 and the threshold plot 305 may be used to illustrate aspects of the elbow-on-elbow technique. The percentile plots 300 may depict a percentage of recordings in the mechanized environment that have magnitudes below different magnitude thresholds (e.g., from 0.000 to 0.014). The threshold plot 305 may depict the thresholds selected for each of the recording, organized in an ascending order.

To determine the noise threshold using the elbow-on-elbow technique, a threshold value may be determined for each recording in a set of recordings of a mechanized environment. For example, a first threshold value may be determined for a first recording, where the first threshold value may correspond to an elbow of a first signal amplitude percentile plot (as represented by the first percentile plot 300-1). The y-axis of the of the first percentile plot 300-1 may indicate signal magnitudes (e.g., using a floating format with a range between −1 and 1), and the x-axis of the first percentile plot 300-1 may indicate a signal amplitude percentage. To determine the elbow position in a percentile plot for a recording, a diagonal line may be drawn from a first point of the plotted line to a last point of the plotted line, and the elbow may be identified as a point on the plotted line that is associated with a largest vertical distance between the diagonal line and the plotted line. Alternatively, a derivative function may be used (e.g., point having highest second derivative), or other function for finding a point of highest curvature of the plot.

Similarly, a second threshold value may be determined for a second recording, where the second threshold value may correspond to an elbow of a second signal amplitude percentile plot (as represented by the second percentile plot 300-2). The y-axis of the of the second percentile plot 300-2 may indicate signal magnitudes (e.g., using an absolute floating format amplitude, dB, etc.), and the x-axis of the second percentile plot 300-2 may indicate a signal amplitude percentage. A third threshold value may be determined for a third recording. And so on. In some examples, the first threshold value is equal to around 0.0005, the second threshold value is equal to around 0.002, a third threshold value is equal to around 0.001, a fourth threshold value is equivalent to around 0.0003, and so on.

After determining the threshold values, the threshold values may be sorted in an ascending order (from the smallest threshold value to the largest threshold value) and plotted (as represented by the threshold plot 305). For example, the example threshold values cited above may be organized as follows (0.0003, 0.0005, 0.001, 0.002). The y-axis of the of the threshold plot 305 may indicate signal magnitudes (e.g., in dB), and the x-axis of the threshold plot 305 may indicate an index of a threshold value after the threshold values are sorted (e.g., may indicate the files sorted by increasing elbow).

After plotting the threshold values, an elbow of the threshold plot 305 may be determined and the corresponding threshold value may be identified (e.g., as being equal to around 0.0002). The threshold value identified using the threshold plot 305 may be used for detecting sounds in subsequent recordings. The threshold value identified using the elbow-on-elbow method covers variations among many audio recordings.

The identified threshold value may be used in combination with the elbow value determined for the subsequent recording to determine a final threshold value for the subsequent recording. For example, if the elbow value for the subsequent recording is greater than the identified threshold value, a threshold value corresponding to the elbow value for the subsequent recording may be used for sound detection. If the elbow value for the subsequent recording is less than the identified threshold value (e.g., and within a percentage, such as 50%, of the identified threshold value), a threshold value corresponding to the elbow value for the subsequent recording may be used for sound detection. If the elbow value for the subsequent recording is less than the identified threshold value (e.g., and outside a percentage, such as 50%, of the identified threshold value), the subsequent recording may be treated as an idle recording and no sound detection may be carried out. In some examples, when the ratio of the threshold value corresponding to the elbow value for the subsequent recording and the identified threshold value are within a range (e.g., between 0.5 and 10), the threshold value corresponding to the elbow value for the subsequent recording may be used to update the identified threshold value—e.g., using an exponential weighted moving average (EWMA).

Figure 4:
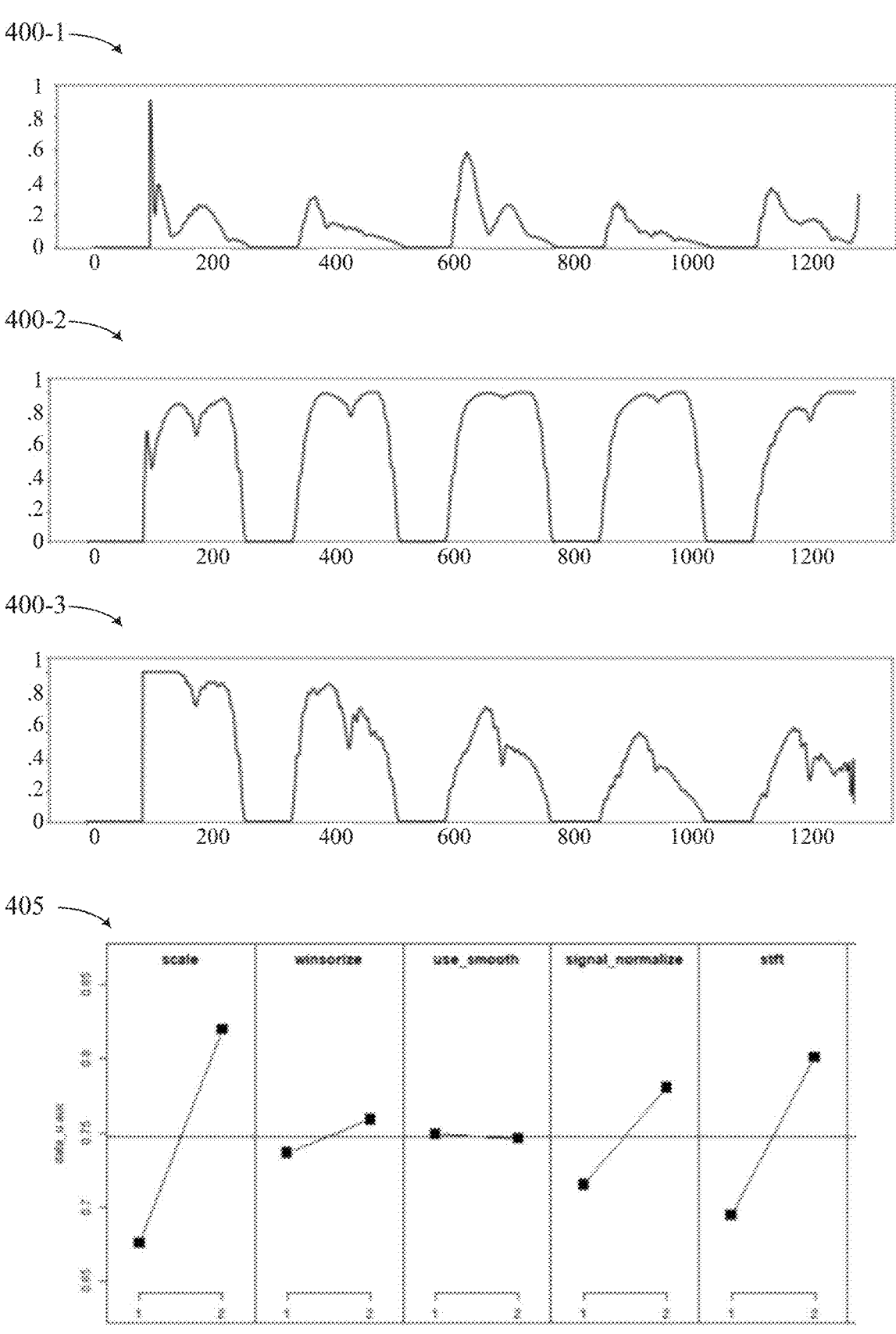
FIG. 4 illustrates aspects of feature engineering that supports abnormal sound detection in a mechanized environment in accordance with examples as disclosed herein.

FIG. 4 illustrates aspects of feature engineering that supports abnormal sound detection in a mechanized environment in accordance with examples as disclosed herein.

Feature engineering may include signal detection and feature extraction (e.g., which may be performed by the feature engineering component 215 of FIG. 2). The feature extraction may include constructing a spectrogram of a detected sound to retain both time and frequency domain information for a sound—e.g., where the sound may be detected using a previously determined noise threshold. Constructing spectrograms using fixed window lengths may result in extracted features that have significantly varied dimensions, which may complicate consistent evaluation of the features extracted from sounds of varying lengths.

Accordingly, a multi-segment spectrogram may be constructed for each signal. For example, a 5-segment spectrogram may be constructed for each signal using a short-term Fourier transform, regardless of the length of each signal. Within each segment a mean spectral computation may be applied to obtain a feature of a same dimension. For signals, that have a length that is below a threshold (e.g., shorter than the duration corresponding to a segmented window size), a tail zero padding may be applied. In some examples, the total feature size of each signal is equal to 1280 (5 segments times 256). Techniques that use a single segment spectral feature and a feature depending on a time delta to equipment events may use telemetry equipment and be customized by different workstations. Although the example of 5-segments is illustrated, different quantities of segments may be used, and the quantity or ranges of the segments may be dynamically determined.

A feature for a first sound (e.g., a robot blade arm move) is illustrated in the first multi-segment spectrogram 400-1. A feature for a second sound (e.g., a robot move) is illustrated in the second multi-segment spectrogram 400-2. A feature for a third sound (e.g., a wafer placement move) is illustrated in the third multi-segment spectrogram 400-3. A y-axis of the multi-segment spectrograms 400 may indicate a spectral features value, and an x-axis of the multi-segment spectrograms 400 may indicate a spectral features index.

The area under curve plot 405 illustrates the effects of various signal processing techniques on area under curve calculations for obtained spectrograms, including row wise scale, winsorize, smoothed signals, column wise signal normalization, and a comparison of multiple segment STFT with single segment STFT.

Figure 5:
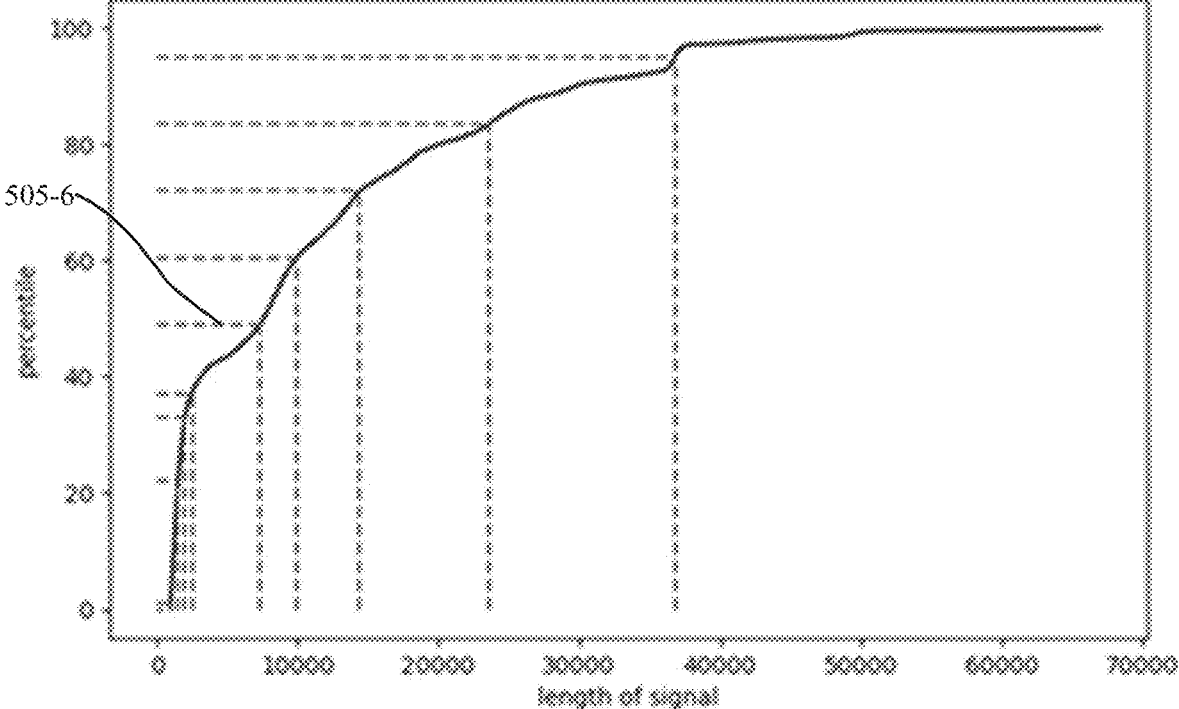
FIG. 5 illustrates aspects of feature engineering that supports abnormal sound detection in a mechanized environment in accordance with examples as disclosed herein.

FIG. 5 illustrates aspects of feature engineering that supports abnormal sound detection in a mechanized environment in accordance with examples as disclosed herein.

As described herein, a multi-segment spectrogram may be generated for a sound. As also described herein, a length of the sounds detected in a mechanized environment may have varying lengths. In some examples, operations for determining a quantity of sound data points to include within each segment of a multi-segment spectrogram may be used—e.g., based on a length of a sound.

In some cases, the percentile plot 500 may be used to determine a quantity of sound data points to include in each segment. The percentile plot may illustrate a percentage of sounds that have lengths below different length thresholds— e.g., for a length threshold of 23500 units (which may be equivalent to 0.53 seconds with a sound recording sampling rate of 44.1 KHz) around 83% of the sounds may have lengths that are less than the length threshold. The percentile plot may include multiple discrete thresholds (e.g., such as the sixth threshold 505-6) corresponding to different signal lengths and percentiles. For example, a first threshold may correspond to a predetermined signal length (e.g., a signal length of 512), which may also be referred to as a word length (WL), and a first percentile (e.g., around 0.5%). A second threshold may correspond to a multiple of the predetermined signal length (e.g., 2*WL) and a second percentile (e.g., around 1%). A third threshold may correspond to a multiple of the predetermined signal length (e.g., 3*WL) and a third percentile (e.g., around 22%). A fourth threshold may correspond to a multiple of the predetermined signal length (e.g., 4*WL) and a fourth percentile (e.g., around 34%). And a fifth threshold may correspond to a multiple of the predetermined signal length (e.g., 5*WL) and a fifth percentile (e.g., around 37.4%).

The remaining thresholds may be equally divided along the remaining range of the percentile axis—e.g., in accordance with the equation $$\frac{95\% - \text{percentile}(5 * WL)}{\text{Segments}_{TH} - 5}.$$

Based on the equation and the distribution of the sound lengths illustrated in FIG. 5, the remaining thresholds may be distributed at intervals of around 11.5% based on computing $$\frac{95\% - 37.4\%}{10 - 5}.$$

Thus, in this example, the sixth threshold 505-6 may correspond to a 48.9% percentile and a signal length of 7380 units, the seventh threshold may correspond to a 60.4% percentile and a signal length of 9960 units, the eighth threshold may correspond to a 71.9% percentile and a signal length of 14415 units, the ninth threshold may correspond to an 83.5% percentile and a signal length of 23611 units, and the tenth threshold may correspond to a 95% percentile and a signal length of 36812 units.

To determine a quantity of segments for which to include sound data, the percentile plot 500 may be used to determine a percentile for the sound based on the length of the sound. For example, it may be determined that a sound having a length of 8000 units is associated with a percentile of around 55%. Accordingly, it may be determined that the sound is greater than the sixth threshold 505-6 and less than the seventh threshold, and the quantity of segments selected for the sound may be equal to six segments. Based on selecting six segments, the sound may be split into six equal length segments, and the remaining four segments may be padded with zeros. A mean spectrum may be calculated for each segment. These techniques for determining a quantity of sound data points to include within each segment of a multi-segment spectrogram may enable the engineered features to maintain signal duration information, frequency domain information, and time domain information (e.g., changes in a profile across a duration of a signal).

Figure 6:
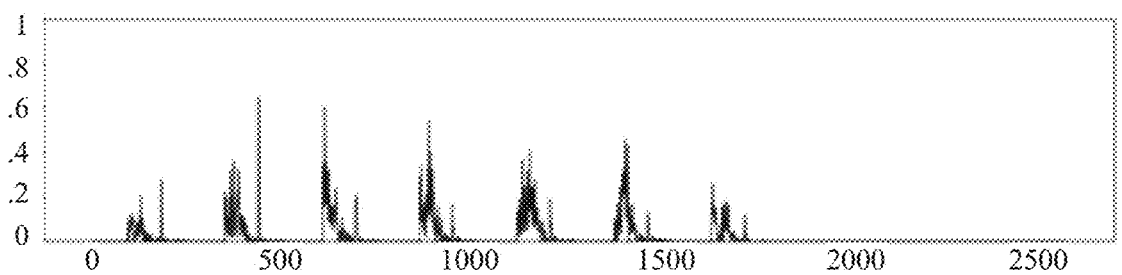
FIG. 6 illustrates aspects of feature engineering that supports abnormal sound detection in a mechanized environment in accordance with examples as disclosed herein.
Figure 6:
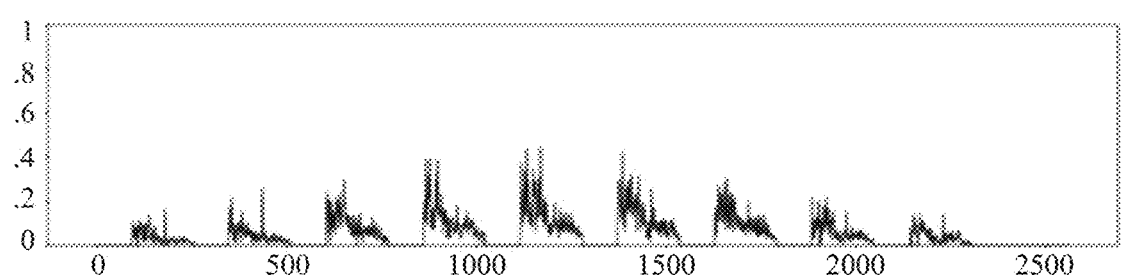
Figure 6:
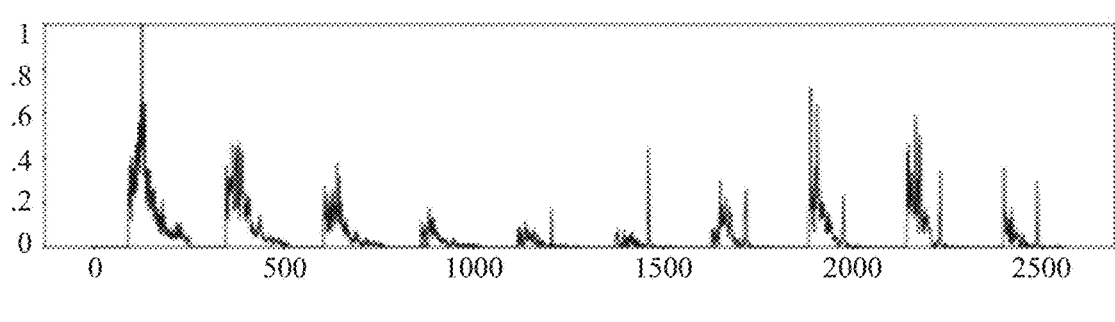

FIG. 6 illustrates aspects of feature engineering that supports abnormal sound detection in a mechanized environment in accordance with examples as disclosed herein.

As described herein, including with reference to FIG. 5, multi-segment spectrograms of varying lengths may be constructed for each sound using a short-term Fourier transform, regardless of the length of each signal. Within each segment a mean spectral computation may be applied to obtain a feature of a same dimension. For signals, that have a length that is below a threshold (e.g., shorter than the duration corresponding to a segmented window size), a tail zero padding may be applied. A feature for a first sound (e.g., a robot blade arm move) is illustrated in the first multi-segment spectrogram 600-1. A feature for a second sound (e.g., a robot move) is illustrated in the second multi-segment spectrogram 600-2. A feature for a third sound (e.g., a wafer placement move) is illustrated in the third multi-segment spectrogram 600-3. A y-axis of the multi-segment spectrograms 600 may indicate a spectral features value, and an x-axis of the multi-segment spectrograms 600 may indicate a spectral features index.

FIGS. 7A through 7C illustrate aspects of sound categorization that supports abnormal sound detection in a mechanized environment in accordance with examples as disclosed herein.

Sound categorization may include clustering sounds (e.g., detected during feature extraction) into categorized clusters and classifying of sounds based on the categorical clusters. The sounds may be clustered using an unsupervised clustering algorithm (e.g., a K-means model, a Bayesian Gaussian mixture model (BGMM), or a spectral clustering model). In some examples, the sounds are clustered based on the features (e.g., spectral features) extracted during feature extraction.

To address overlap among different sound clusters (which may increase as the number of sounds increases), a hybrid filtering method may be used for the clustering. After an unsupervised clustering algorithm (e.g., a spectral clustering algorithm) is executed, the hybrid filtering method may include applying (e.g., as a first pass noise filter) a one-class support vector machine (OCSVM) algorithm to each cluster to obtain a filtered data set. The hybrid filtering method may subsequently include applying a convolutional neural network (CNN) classification to the filtered data set, where a filtering is carried out by a voting between the CNN classification and the spectral clustering, with only matched records being kept (and thus the mismatched records being discarded) to obtain filtered clusters.

To determine a quantity of clusters to use, a silhouette score may be determined for different quantities of clusters. The silhouette score may be a measure of how similar a sound is to the sounds in the same cluster as the sound with comparison to sounds in other clusters.

In some examples, a second pass of clustering may be performed. For example, a second pass of spectral clustering, OCSVM filtering, and CNN classification may be performed. In some examples, the clustering result of the pass with the highest silhouette score may be selected.

FIG. 7A depicts an example categorization algorithm 700-a, which includes an example clustering algorithm 705-a for clustering the sounds. The clustering algorithm 705-a may include first operations for processing the training sounds, where the training sounds may be obtained as a result of a feature engineering process. Based on processing the training sounds, a first spectral clustering pass may be applied to cluster the training sounds based on their spectral characteristics. Next, an OCSVM filter may be applied to the clustered training sounds to obtain a filtered set of training sounds, which may be inputted into a CNN model for classification. The resulting classifications of the CNN model may be compared with the clustering result of the OCSVM filter, and mismatches (e.g., training sounds that are classified as belonging to a different cluster than the clustering result) may be discarded. Some clustering algorithms may generate small and/or insignificant clusters. In some examples, small clusters having a percentage of the sounds that is less than may be removed, where k may be the number of clusters.

Subsequently, a second spectral clustering may be performed for the training sounds, and the clustering result with the highest silhouette score may be retained. Based on selecting the clustering result with the highest silhouette score, a second OCSVM filter may be applied to the selected clustering result to obtain a filtered set of training sounds. The filtered set of training sounds may then be upsampled and similarly inputted into a CNN model for classification. Similarities between the clusters obtained using the first and second rounds of clustering may then be identified. In some examples, median probabilities as to which cluster each sound belongs may be calculated, and a probability matrix may be obtained. For example, for three (3) clusters, the probability matrix may be $[p_{11}, p_{12}, p_{13}; p_{21}, p_{22}, p_{23}; p_{31}, p_{32}, p_{33}]$, where $p_{ij}$ may represent the median probability of sound from cluster i being predicted as cluster j by the CNN model. For any two clusters, when the probability $p_{ii}$ is smaller than a first threshold (e.g., 0.85) and the probability $p_{ij}$ that the sound being predicted as another cluster is larger than a second threshold (e.g., 0.15), these two clusters may be regarded as similar and merged into a single cluster.

FIG. 7B depicts an example clustering result with three clusters. The y-axis of the clustering plot 701-b may correspond to a first principal component and the x-axis may correspond to a second principal component. In some examples, the darkest cluster may be assigned the label of "A," the second darkest cluster may be assigned the label of "B," and the lightest cluster may be assigned the label of "C." FIG. 7C illustrates an example silhouette score for a clustering procedure, where five clusters are determined as the preferred clustering quantity. The silhouette score diagram 702-c may illustrate a silhouette score for the clustering result if different quantities of clusters are used.

After selecting the preferred clustering result, the clusters (and the sounds within the clusters) may be classified. For example, a generic label of "A," "B," "C," etc. may be applied to respective clusters (and to the sounds within the clusters). The labeled sounds may be inputted into a CNN for supervised deep learning modeling to obtain a trained model for predicting a classification of subsequently received sounds. FIG. 7A depicts an example classification algorithm 710-a for classifying sounds. The classification algorithm 710-a may include labeling the clusters in the final clustering result obtained using the clustering algorithm 705-a (e.g., with a unique label, such as "A," "B." "C." etc.), where each training sound in a cluster may be labeled with the same identifier as the cluster. The labeled sounds may then be inputted into a CNN model for supervised training of the CNN model and to obtain a trained CNN model, which may be saved and may output data in a comma separated format or SQL-like database. Based on training the CNN model, the trained CNN model may be used to predict a classification for subsequent sounds received by the failure detection system.

Accordingly, the categorization algorithm 700-a may enable the unsupervised clustering of sounds detected in a mechanized environment and the supervised training of a deep-learning model for classifying sounds detected in the mechanized environment without any human intervention (e.g., without manual labeling of a training set of sounds for the deep-learning model). Thus, the high accuracy of a supervised trained CNN can be obtained while an unsupervised algorithm can be used to prepare the training sets for the CNN.

Figure 8:
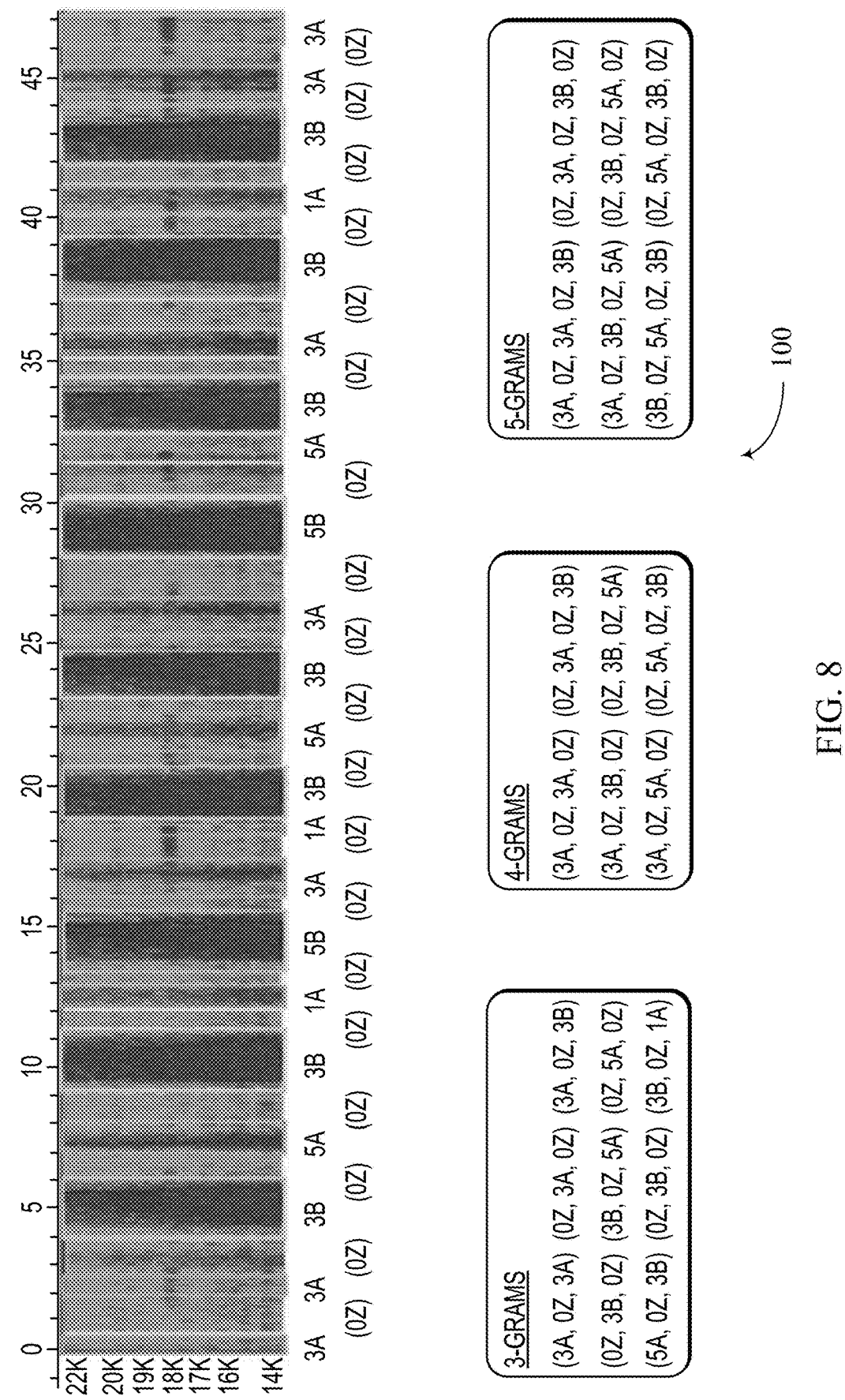
FIG. 8 illustrates aspects of pattern library construction that supports abnormal sound detection in a mechanized environment in accordance with examples as disclosed herein.

FIG. 8 illustrates aspects of pattern library construction that supports abnormal sound detection in a mechanized environment in accordance with examples as disclosed herein.

Pattern library construction may include identifying, in an audio recording, categorical sounds (e.g., based on the sound categorization), where the categorical sounds may include sounds that fall into a previously designated sound category (e.g., "A," "B." "C." etc.) and the absence of sound (which may be referred to as "idle" sound). Pattern library construction may further include identifying a discretized magnitude (e.g., on a normalized scale of 0 to 10) of each categorical sound. An idle sound may have a magnitude value of 0. In some examples, the normalized magnitude scale may include only odd values (e.g., to decrease a size of the library). Pattern library construction may also include identifying the duration of a preceding idle period prior to a sound, where the duration value may be given as a multiplier of 400 milliseconds.

The above operations may be used to generate n-grams (which may refer to neighboring sequences of sounds) for detected sounds. For example, the following n-gram table may be constructed based on detected sounds:

| i | $\bar{a}_i$ | $\bar{y}_i$ | $\bar{t}_i$ | Representation |
|---|---|---|---|---|
| 1 | 5 | B | 0 | (5B) |
| 2 | 5 | A | 1 | (0Z, 5A) |
| 3 | 3 | C | 2 | (0Z, 0Z, 3C) |
| 4 | 7 | B | 4 | (0Z, 0Z, 0Z, 0Z, 7B) |
| . | . | . | . | . |
| . | . | . | . | . |
| . | . | . | . | . | where i may correspond to an index of a detected sound, $\bar{a}_i$ may correspond to an amplitude of the ith detected sound, $\bar{y}_i$ may correspond to the sound category that corresponds to the ith detected sound, and $\bar{t}_i$ may correspond to a duration preceding the ith detected sound (e.g., relative to a preceding sound or a beginning of a recording if there are no preceding sounds. For example, for a first detected sound (corresponding to index 1), the first sound may be determined as having a level 5 magnitude, as corresponding to the "B" category and as being detected without delay, and may be represented as (5B). A second detected sound (corresponding to index 2) may be determined as having a level 5 magnitude, as corresponding to the "A" category and as being detected with a first delay (e.g., at least 400 milliseconds), and may be represented as (0Z, 5A). A third detected sound (corresponding to index 3) may be determined as having a level 3 magnitude, as corresponding to the "C" category and as being detected with a third delay (e.g., at least 1000 ms), and may be represented as (0Z, 0Z, 3C). A fourth detected sound (corresponding to index 4) may be determined as having a level 7 magnitude, as corresponding to the "B" category and as being detected with a fourth delay (e.g., at least 1600 ms), and may be represented as (0Z, 0Z, 0Z, 0Z, 7B).

FIG. 8 may depict the formation of an n-gram for combinations of sounds. In some examples, FIG. 8 may depict a representation of a sound recording (e.g., for a robot handler), and the formation of 3-grams, 4-grams, and 5-grams for the sound recording. For example, for the 3-gram example, 3-grams may be generated based on a sliding window that extends across three sounds of the sound recording (including idle sounds). For the 4-gram example, 4-grams may be generated based on a sliding window that extends across four sounds of the sound recording. And for the 5-gram example, 5-grams may be generated based on a sliding window that extends across five sounds of the sound recording. The n-grams formed for the sound recording may retain time domain amplitude, frequency domain information, and relative time distance between signals.

The n-grams identified for the sound recording may be stored in a sound pattern library (which may also be referred to as an n-gram library). Also, n-grams identified for other sound recordings that occur in a mechanized environment may be similarly stored in the sound pattern library. In some examples, multiple sound patterns may be stored for a particular event (e.g., a robot arm movement) to capture common variations. In some examples, only sound patterns that are identified a threshold quantity of times are stored in the sound pattern library.

In some examples, a dynamic frequency computation is used to determine which sound patterns to store in the sound pattern library. For each n-gram containing m non-idle signals, a metric may be defined as the ratio of the actual frequency against the random distribution frequency, where the ratio may be compared against a threshold. N-grams for which the metric is above the threshold may be added to the sound pattern library during the training phase, where those n-grams for which the metric is below the threshold may be discarded as noise.

Figures 9A, 9B:
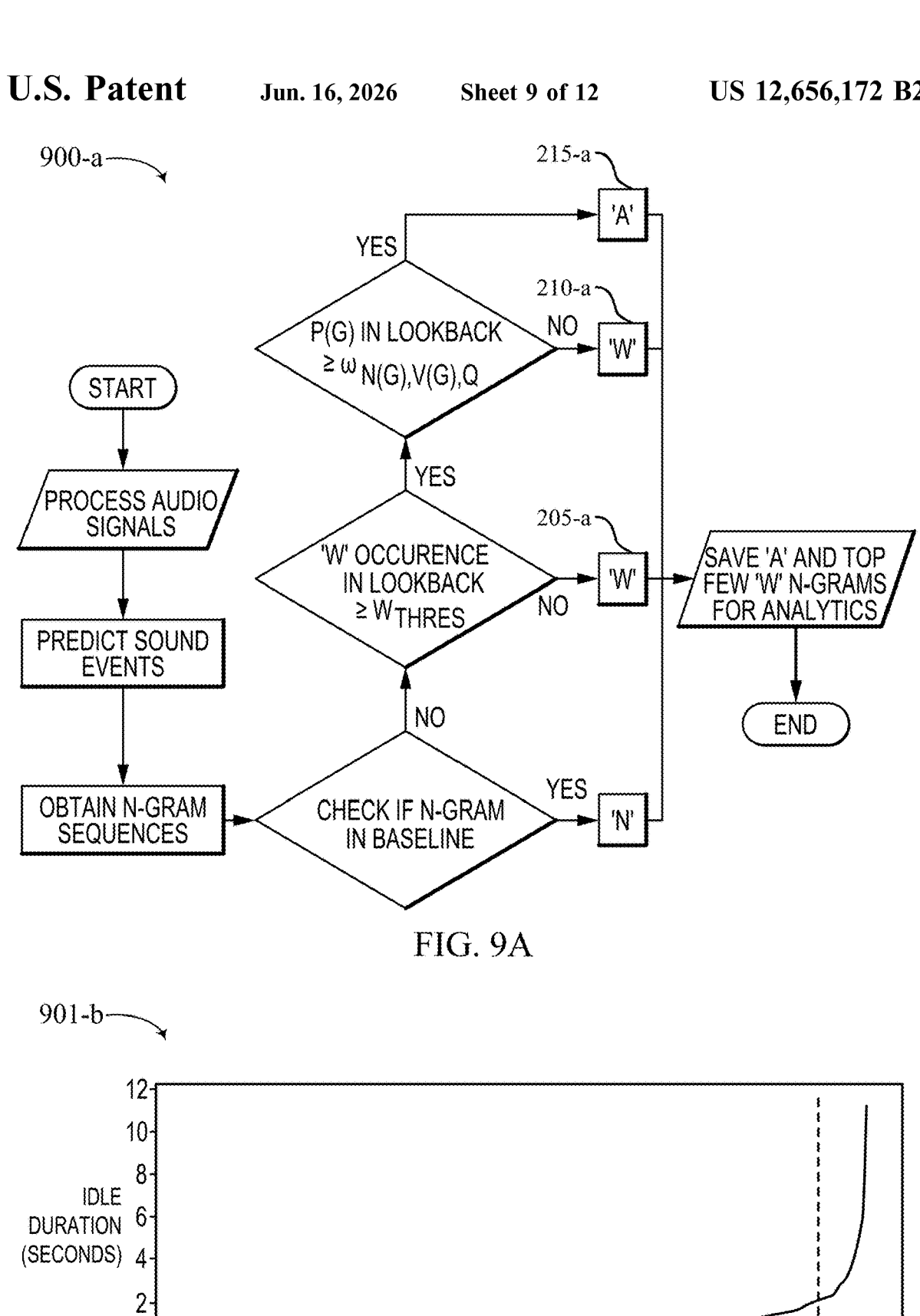
FIGS. 9A and 9B illustrate aspects of pattern detection that supports abnormal sound detection in a mechanized environment in accordance with examples as disclosed herein.

FIGS. 9A and 9B illustrate aspects of pattern detection that supports abnormal sound detection in a mechanized environment in accordance with examples as disclosed herein.

The flowchart 900-$a$ illustrates an example set of operations for determining whether detected sound patterns are included in or excluded from the sound pattern library. As depicted in the flowchart 900-$a$, audio signals may be processed (e.g., in accordance with the feature engineering operations described herein). Based on processing the audio signals, sounds in the audio signals may be categorized (e.g., using the trained CNN classification model) and n-gram sequences may be obtained (e.g., in accordance with the pattern library construction operations described herein).

Based on obtaining n-gram sequences from the audio signals, the obtained n-gram sequences may be checked against the n-gram sequences stored in the library. If the n-gram sequence is stored in the library, then the n-gram may be flagged (e.g., with the letter "N") to indicate that the n-gram is in the n-gram library. If the n-gram is not in the library (is a "novel" or "abnormal" n-gram), then it may be determined whether the n-gram has occurred a first threshold quantity of times. If the n-gram has not occurred the threshold quantity of times, then the n-gram may be flagged with a warning at 905-$a$. If the n-gram has occurred the threshold quantity of times, then it may be determined whether the n-gram satisfies a second threshold. In some examples, the second threshold may be frequency based— e.g., based on a length of the n-gram relative to a length of non-idle sounds. If the n-gram does not satisfy the second threshold, then the n-gram may be flagged with a warning at 910-$a$ (e.g., a same or different warning than used if the n-gram has not occurred the threshold quantity of times). If the n-gram satisfies the second threshold (e.g., if a frequency of occurrence for the n-gram exceeds the second threshold), then an alarm may be triggered for the n-gram at 915-$a$. Accordingly, low-occurrence n-grams (e.g., caused by sound from nearby equipment maintenance) may be ignored or flagged as a warning without triggering an alarm.

In some examples, the threshold quantities are different for n-grams of different lengths. For examples, a higher threshold quantity may be set for occurrences of abnormal 3-grams than for abnormal 5-grams. Accordingly, fewer occurrences of abnormal 5-grams may trigger an alarm or warning than for abnormal 3-grams or abnormal 4-grams.

To accommodate for drift in the noise threshold for detecting sounds, an elbow may be determined for each sound file processed in accordance with the operations illustrated in flowchart 900-a. In such cases, an exponential weighted moving average may be applied to the previously determined elbow for determining the noise threshold using the currently determined elbows.

To accommodate for long idle periods (e.g., 1 to 10 seconds) between different equipment movement sequences, an automatic n-gram segmentation method may be used that split an N-gram containing a long idle period into shorter groups of N-grams. In some examples, an elbow detection may be applied to a signal idle period percentile distribution plot to identify an idle period for segmentation. FIG. 9B depicts an example signal idle period percentile distribution plot (e.g., percentile plot 901-b), where the elbow is detected at a point where around 93% of n-grams have less than two (2) seconds of idle duration. In such cases, an n-gram containing a long idle period (e.g., greater than 2 sections) may be split into multiple n-grams.

Figure 10:
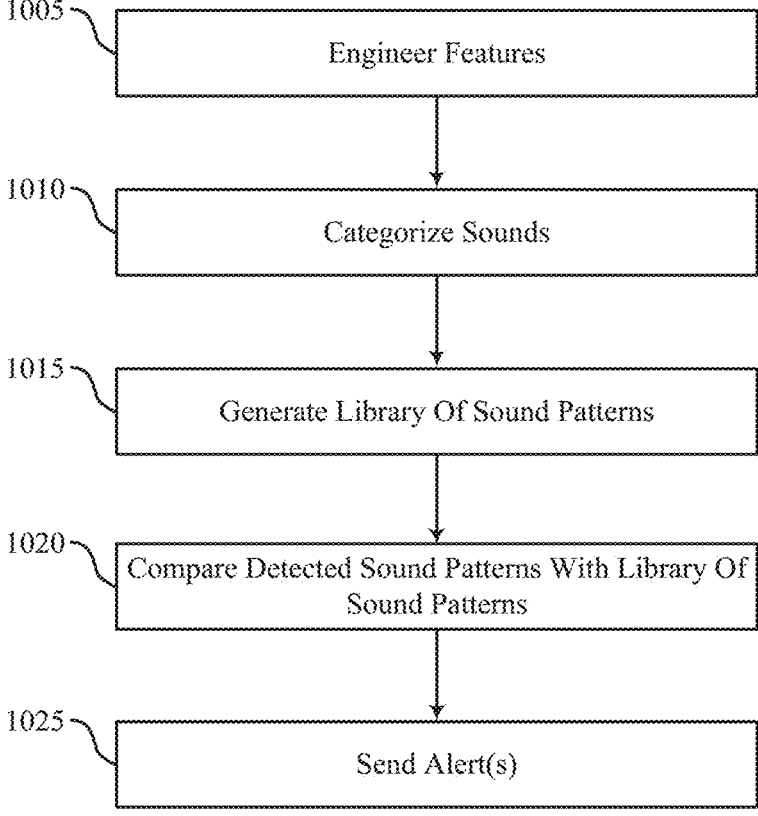
FIG. 10 illustrates an example of a set of operations for abnormal sound detection in a mechanized environment in accordance with examples as disclosed herein.

FIG. 10 illustrates an example of a set of operations for abnormal sound detection in a mechanized environment in accordance with examples as disclosed herein.

The flowchart 1000 may be performed by a failure detection device (e.g., the failure detection device 210) described herein. In some examples, the flowchart 1000 illustrates an example set of operations performed to support abnormal sound detection in a mechanized environment. For example, the flowchart 1000 may include operations for building a library of sound patterns used to detect abnormal sounds in a mechanized environment that are indicative of a failure or impending failure.

Aspects of the flowchart 1000 may be implemented by a controller, among other components. Additionally. or alternatively, aspects of the flowchart 1000 may be implemented as instructions stored in memory (e.g., firmware stored in a memory coupled with a controller). For example, the instructions, when executed by a controller, may cause the controller to perform the operations of the flowchart 1000.

One or more of the operations described in the flowchart 1000 may be performed earlier or later, omitted, replaced, supplemented, or combined with another operation. Also, additional operations described herein may replace, supplement or be combined with one or more of the operations described in the flowchart 1000.

At 1005, feature engineering may be performed (e.g., by the feature engineering component 215 of FIG. 2) to process audio signals (e.g., sounds) and to extract spectral features from the audio signals as described herein, including with reference to FIGS. 3 through 6.

At 1010, the audio signals may be categorized (e.g., by the categorization component 220 of FIG. 2). Categorizing the audio signals may include clustering the audio signals (e.g., based on the extracted spectral features), training a classification model, and classifying the clustered audio signals as described herein, including with reference to FIGS. 7A through 7C.

At 1015, categorical sounds and combinations of categorical sounds may be detected (e.g., using the trained classification model) and used to construct (e.g., by pattern library component 225 of FIG. 2) a library of sound patterns (which may also be referred to as n-grams)—e.g., during a training or library construction period. The library of sound patterns may be generated as described herein, including with reference to FIG. 8.

At 1020, sound patterns detected in audio signals may be compared (e.g., by pattern detection component 230 of FIG. 2) with sound patterns stored in the library of sound patterns to detect sound patterns that are excluded from the library of sound patterns (e.g., "abnormal" sound patterns) as described herein, including with reference to FIGS. 9A and 9B.

At 1025, alerts may be sent (e.g., by the alert component 235) based on an abnormal sound pattern occurring a threshold quantity of times as described herein, including with reference to FIGS. 9A and 9B.

Figure 11:
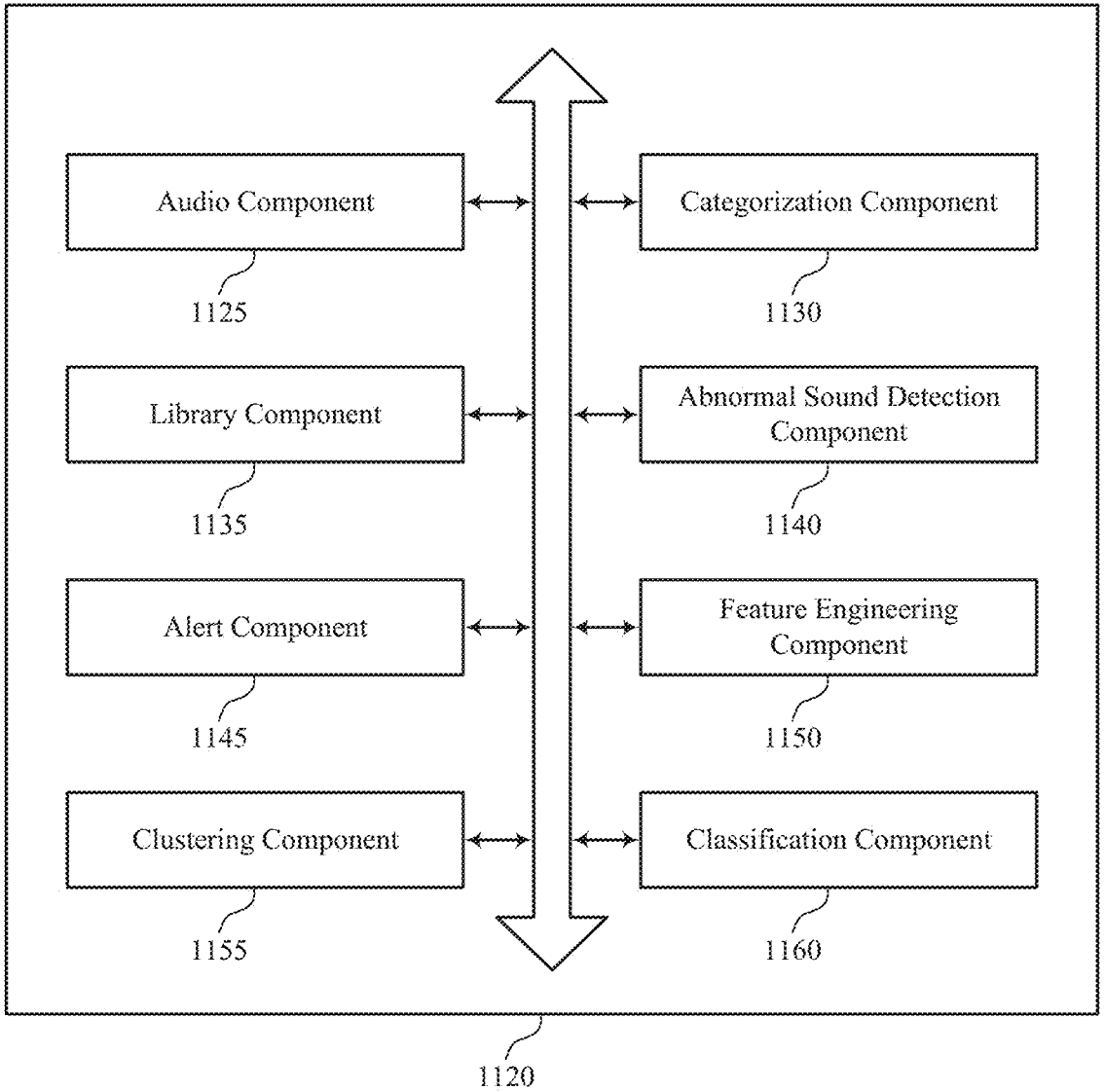
FIG. 11 illustrates a block diagram of a failure detection system that supports abnormal sound detection in a mechanized environment in accordance with examples as disclosed herein.

FIG. 11 illustrates a block diagram 1100 of a failure detection system 1120 that supports abnormal sound detection in a mechanized environment in accordance with examples as disclosed herein. The failure detection system 1120 may be an example of aspects of a failure detection system as described with reference to FIGS. 1 through 10. The failure detection system 1120, or various components thereof, may be an example of means for performing various aspects of abnormal sound detection in a mechanized environment as described herein. For example, the failure detection system 1120 may include an audio component 1125, a categorization component 1130, a library component 1135, an abnormal sound detection component 1140, an alert component 1145, a feature engineering component 1150, a clustering component 1155, a classification component 1160, or any combination thereof. Each of these components may communicate, directly or indirectly, with one another (e.g., via one or more buses).

The audio component 1125 may be configured as or otherwise support a means for obtaining an audio recording of a mechanized environment. The categorization component 1130 may be configured as or otherwise support a means for categorizing first sounds extracted from the audio recording into a set of categorical sounds. The library component 1135 may be configured as or otherwise support a means for generating, using the set of categorical sounds, a library of first sound patterns based on second sounds that are extracted from the audio recording, the first sound patterns including sequences of categorical sounds of the set of categorical sounds. In some examples, the audio component 1125 may be configured as or otherwise support a means for receiving audio data including audio signals captured by one or more sensors in the mechanized environment. The abnormal sound detection component 1140 may be configured as or otherwise support a means for comparing, based on receiving the audio data, second sound patterns detected in the audio signals with the first sound patterns. In some examples, the abnormal sound detection component 1140 may be configured as or otherwise support a means for identifying, based on comparing the second sound patterns with the first sound patterns, a sound pattern of the second sound patterns that is excluded from the library of the first sound patterns.

In some examples, the abnormal sound detection component 1140 may be configured as or otherwise support a means for determining, based on detecting that the sound pattern of the second sound patterns is excluded from the library of the first sound patterns, that the sound pattern of the second sound patterns has occurred a threshold quantity of times. In some examples, the alert component 1145 may be configured as or otherwise support a means for sending, based on detecting that the sound pattern of the second sound patterns has occurred the threshold quantity of times, an alert to inspect the mechanized environment.

In some examples, the threshold quantity of times is based on a length of the sound pattern of the second sound patterns or a length of the sound pattern of the second sound patterns in combination with the length of non-idle sounds in the sound patterns.

In some examples, the feature engineering component 1150 may be configured as or otherwise support a means for extracting sounds from the audio recording based on a noise threshold for the mechanized environment, where the audio recording includes a plurality of audio files including the sounds, and where the sounds include the first sounds. In some examples, the feature engineering component 1150 may be configured as or otherwise support a means for determining, from the sounds extracted from the audio recording, one or more spectral components for the first sounds.

In some examples, the feature engineering component 1150 may be configured as or otherwise support a means for generating a plurality of signal amplitude percentile curves for the plurality of audio files. In some examples, the feature engineering component 1150 may be configured as or otherwise support a means for identifying, in each of the plurality of signal amplitude percentile curves, a respective elbow feature associated with a respective noise threshold. In some examples, the feature engineering component 1150 may be configured as or otherwise support a means for generating a second curve that plots respective noise thresholds determined for each audio file in an ascending order.

In some examples, the feature engineering component 1150 may be configured as or otherwise support a means for identifying, in the second curve, an elbow feature associated with the noise threshold. In some examples, the feature engineering component 1150 may be configured as or otherwise support a means for determining, based on identifying the elbow feature, the noise threshold, where the noise threshold is used for subsequent processing of the audio recording.

In some examples, to support determining the one or more spectral components for the first sounds, the feature engineering component 1150 may be configured as or otherwise support a means for constructing a multi-segment spectrogram for each sound of the first sounds extracted from the audio recording.

In some examples, to support constructing the multi-segment spectrogram includes for a sound of the first sounds, the feature engineering component 1150 may be configured as or otherwise support a means for computing, for the sound, a mean spectrum within each segment of the multi-segment spectrogram.

In some examples, to support constructing the multi-segment spectrogram for a sound of the first sounds, the feature engineering component 1150 may be configured as or otherwise support a means for determining a first quantity of segments for the sound based on a length of the sound, where the multi-segment spectrogram includes the first quantity of segments and a second quantity of segments. In some examples, to support constructing the multi-segment spectrogram for a sound of the first sounds, the feature engineering component 1150 may be configured as or otherwise support a means for padding the second quantity of segments with zeros. In some examples, to support constructing the multi-segment spectrogram for a sound of the first sounds, the feature engineering component 1150 may be configured as or otherwise support a means for computing, for the sound, a mean spectrum within each segment of the multi-segment spectrogram.

In some examples, the clustering component 1155 may be configured as or otherwise support a means for clustering the first sounds into a plurality of clusters based on the one or more spectral components of the first sounds.

In some examples, to support clustering the sounds, the clustering component 1155 may be configured as or otherwise support a means for applying a one-class support vector machine algorithm to each cluster of the plurality of clusters to filter out a subset of the first sounds identified as noise, w % here a plurality of filtered clusters including filtered sounds is obtained based on applying the one-class support vector machine algorithm. In some examples, to support clustering the sounds, the clustering component 1155 may be configured as or otherwise support a means for classifying, using a convolutional neural network, the first sounds to obtain a plurality of classifications of the first sounds. In some examples, to support clustering the sounds, the clustering component 1155 may be configured as or otherwise support a means for discarding a second subset of the first sounds that are mismatched between the plurality of clusters and the plurality of classifications.

In some examples, to support clustering the sounds, the categorization component 1130 may be configured as or otherwise support a means for calculating a plurality of silhouette scores based on the plurality of clusters including different quantities of clusters. In some examples, to support clustering the sounds, the categorization component 1130 may be configured as or otherwise support a means for selecting a quantity for the plurality of clusters associated with a highest silhouette score of the plurality of silhouette scores.

In some examples, the first sounds are clustered into the plurality of clusters using an unsupervised clustering procedure.

In some examples, to support categorizing the first sounds into the set of categorical sounds, the classification component 1160 may be configured as or otherwise support a means for assigning respective identifiers of a plurality of identifiers to respective filtered clusters of the plurality of clusters, where the respective identifiers correspond to respective categorical sounds of the set of categorical sounds, and where respective subsets of the first sounds included in the respective filtered clusters are labeled with respective identifiers assigned to the respective filtered clusters to obtain labeled sounds.

In some examples, the classification component 1160 may be configured as or otherwise support a means for training a convolutional neural network using the labeled sounds. In some examples, the classification component 1160 may be configured as or otherwise support a means for extracting, based on training the convolutional neural network, the second sounds from the audio recording. In some examples, the classification component 1160 may be configured as or otherwise support a means for inputting the second sounds into the trained convolutional neural network, where the second sounds are categorized into the set of categorical sounds based on the second sounds being inputted into the trained convolutional neural network.

In some examples, to support generating the library of the first sound patterns, the library component 1135 may be configured as or otherwise support a means for identifying each sound in respective subsets of the second sounds, the second sounds including one or more idle periods that correspond to one or more quiet periods between categorical sounds, where the set of categorical sounds includes an idle sound associated with idle periods between categorical sounds. In some examples, to support generating the library of the first sound patterns, the library component 1135 may be configured as or otherwise support a means for determining, for each sound in the respective subsets of the second sounds, a respective magnitude and a respective categorical sound. In some examples, to support generating the library of the first sound patterns, the library component 1135 may be configured as or otherwise support a means for identifying, in the second sounds, the sequences of categorical sounds of the set of categorical sounds that repeat a threshold quantity of times. In some examples, to support generating the library of the first sound patterns, the library component 1135 may be configured as or otherwise support a means for storing, in the library of the first sound patterns, the sequences of categorical sounds that occur the threshold quantity of times.

In some examples, the library component 1135 may be configured as or otherwise support a means for detecting the second sound patterns, where detecting the second sound patterns may include identifying each sound in respective subsets of third sounds that are extracted from the audio signals captured from the mechanized environment, determining, for each sound in the respective subsets of the third sounds, a respective magnitude and a respective categorical sound; and identifying, in the third sounds, second sequences of categorical sounds of the set of categorical sounds.

In some examples, to support generating the library of the first sound patterns, the library component 1135 may be configured as or otherwise support a means for applying an n-gram natural language processing method to the first sounds to obtain a plurality of n-grams.

In some examples, the mechanized environment includes a manufacturing environment, an engine environment, a robotic environment, a vehicle environment, a motor environment, or any combination thereof.

FIG. 12 illustrates a flowchart showing a method 1200 that supports abnormal sound detection in a mechanized environment in accordance with examples as disclosed herein. The operations of method 1200 may be implemented by a failure detection system or its components as described herein. For example, the operations of method 1200 may be performed by a failure detection system as described with reference to FIGS. 1 through 11. In some examples, a failure detection system may execute a set of instructions to control the functional elements of the device to perform the described functions. Additionally, or alternatively, the failure detection system may perform aspects of the described functions using special-purpose hardware.

At 1205, the method may include obtaining an audio recording of a mechanized environment. The operations of 1205 may be performed in accordance with examples as disclosed herein. In some examples, aspects of the operations of 1205 may be performed by an audio component 1125 as described with reference to FIG. 11.

At 1210, the method may include categorizing first sounds extracted from the audio recording into a set of categorical sounds. The operations of 1210 may be performed in accordance with examples as disclosed herein. In some examples, aspects of the operations of 1210 may be performed by a categorization component 1130 as described with reference to FIG. 11.

At 1215, the method may include generating, using the set of categorical sounds, a library of first sound patterns based on second sounds that are extracted from the audio recording, the first sound patterns including sequences of categorical sounds of the set of categorical sounds. The operations of 1215 may be performed in accordance with examples as disclosed herein. In some examples, aspects of the operations of 1215 may be performed by a library component 1135 as described with reference to FIG. 11.

At 1220, the method may include receiving audio data including audio signals captured by one or more sensors in the mechanized environment. The operations of 1220 may be performed in accordance with examples as disclosed herein. In some examples, aspects of the operations of 1220 may be performed by an audio component 1125 as described with reference to FIG. 11.

At 1225, the method may include comparing, based on receiving the audio data, second sound patterns detected in the audio signals with the first sound patterns. The operations of 1225 may be performed in accordance with examples as disclosed herein. In some examples, aspects of the operations of 1225 may be performed by an abnormal sound detection component 1140 as described with reference to FIG. 11.

At 1230, the method may include identifying, based on comparing the second sound patterns with the first sound patterns, a sound pattern of the second sound patterns that is excluded from the library of the first sound patterns. The operations of 1230 may be performed in accordance with examples as disclosed herein. In some examples, aspects of the operations of 1230 may be performed by an abnormal sound detection component 1140 as described with reference to FIG. 11.

In some examples, an apparatus as described herein may perform a method or methods, such as the method 1200. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for obtaining an audio recording of a mechanized environment: categorizing first sounds extracted from the audio recording into a set of categorical sounds: generating, using the set of categorical sounds, a library of first sound patterns based on second sounds that are extracted from the audio recording, the first sound patterns including sequences of categorical sounds of the set of categorical sounds: receiving audio data including audio signals captured by one or more sensors in the mechanized environment: comparing, based on receiving the audio data, second sound patterns detected in the audio signals with the first sound patterns; and identifying, based on comparing the second sound patterns with the first sound patterns, a sound pattern of the second sound patterns that is excluded from the library of the first sound patterns.

Aspect 2: The method, apparatus, or non-transitory computer-readable medium of aspect 1, further including operations, features, circuitry, logic, means, or instructions, or any combination thereof for determining, based on detecting that the sound pattern of the second sound patterns is excluded from the library of the first sound patterns, that the sound pattern of the second sound patterns has occurred a threshold quantity of times and sending, based on detecting that the sound pattern of the second sound patterns has occurred the threshold quantity of times, an alert to inspect the mechanized environment.

Aspect 3: The method, apparatus, or non-transitory computer-readable medium of aspect 2, where the threshold quantity of times is based on a length of the sound pattern of the second sound patterns or a length of the sound pattern of the second sound patterns in combination with the length of non-idle sounds in the sound patterns.

Aspect 4: The method, apparatus, or non-transitory computer-readable medium of any of aspects 1 through 3, further including operations, features, circuitry, logic, means, or instructions, or any combination thereof for extracting sounds from the audio recording based on a noise threshold for the mechanized environment, where the audio recording includes a plurality of audio files including the sounds, and where the sounds include the first sounds and determining, from the sounds extracted from the audio recording, one or more spectral components for the first sounds.

Aspect 5: The method, apparatus, or non-transitory computer-readable medium of aspect 4, further including operations, features, circuitry, logic, means, or instructions, or any combination thereof for generating a plurality of signal amplitude percentile curves for the plurality of audio files; identifying, in each of the plurality of signal amplitude percentile curves, a respective elbow feature associated with a respective noise threshold; and generating a second curve that plots respective noise thresholds determined for each audio file in an ascending order.

Aspect 6: The method, apparatus, or non-transitory computer-readable medium of aspect 5, further including operations, features, circuitry, logic, means, or instructions, or any combination thereof for identifying, in the second curve, an elbow feature associated with the noise threshold and determining, based on identifying the elbow feature, the noise threshold, where the noise threshold is used for subsequent processing of the audio recording.

Aspect 7: The method, apparatus, or non-transitory computer-readable medium of any of aspects 4 through 6, where determining the one or more spectral components for the first sounds includes operations, features, circuitry, logic, means, or instructions, or any combination thereof for constructing a multi-segment spectrogram for each sound of the first sounds extracted from the audio recording.

Aspect 8: The method, apparatus, or non-transitory computer-readable medium of aspect 7, where constructing the multi-segment spectrogram includes for a sound of the first sounds includes operations, features, circuitry, logic, means, or instructions, or any combination thereof for computing, for the sound, a mean spectrum within each segment of the multi-segment spectrogram.

Aspect 9: The method, apparatus, or non-transitory computer-readable medium of any of aspects 7 through 8, where constructing the multi-segment spectrogram for a sound of the first sounds includes operations, features, circuitry, logic, means, or instructions, or any combination thereof for determining a first quantity of segments for the sound based on a length of the sound, where the multi-segment spectrogram includes the first quantity of segments and a second quantity of segments; padding the first quantity of segments, the second quantity of segments, or both, with zeros; and computing, for the sound, a mean spectrum within each segment of the multi-segment spectrogram.

Aspect 10: The method, apparatus, or non-transitory computer-readable medium of any of aspects 4 through 9, further including operations, features, circuitry, logic, means, or instructions, or any combination thereof for clustering the first sounds into a plurality of clusters based on the one or more spectral components of the first sounds.

Aspect 11: The method, apparatus, or non-transitory computer-readable medium of aspect 10, where clustering the sounds further includes operations, features, circuitry, logic, means, or instructions, or any combination thereof for applying a one-class support vector machine algorithm to each cluster of the plurality of clusters to filter out a subset of the first sounds identified as noise, where a plurality of filtered clusters including filtered sounds is obtained based on applying the one-class support vector machine algorithm; classifying, using a convolutional neural network, the first sounds to obtain a plurality of classifications of the first sounds; and discarding a second subset of the first sounds that are mismatched between the plurality of clusters and the plurality of classifications.

Aspect 12: The method, apparatus, or non-transitory computer-readable medium of aspect 11, where clustering the sounds further includes operations, features, circuitry, logic, means, or instructions, or any combination thereof for calculating a plurality of silhouette scores based on the plurality of clusters including different quantities of clusters and selecting a quantity for the plurality of clusters associated with a highest silhouette score of the plurality of silhouette scores.

Aspect 13: The method, apparatus, or non-transitory computer-readable medium of any of aspects 10 through 12, where the first sounds are clustered into the plurality of clusters using an unsupervised clustering procedure.

Aspect 14: The method, apparatus, or non-transitory computer-readable medium of any of aspects 10 through 13, where categorizing the first sounds into the set of categorical sounds includes operations, features, circuitry, logic, means, or instructions, or any combination thereof for assigning respective identifiers of a plurality of identifiers to respective filtered clusters of the plurality of clusters, where the respective identifiers correspond to respective categorical sounds of the set of categorical sounds, and where respective subsets of the first sounds included in the respective filtered clusters are labeled with respective identifiers assigned to the respective filtered clusters to obtain labeled sounds.

Aspect 15: The method, apparatus, or non-transitory computer-readable medium of aspect 14, further including operations, features, circuitry, logic, means, or instructions, or any combination thereof for training a convolutional neural network using the labeled sounds; extracting, based on training the convolutional neural network, the second sounds from the audio recording; and inputting the second sounds into the trained convolutional neural network, where the second sounds are categorized into the set of categorical sounds based on the second sounds being inputted into the trained convolutional neural network.

Aspect 16: The method, apparatus, or non-transitory computer-readable medium of any of aspects 1 through 15, where generating the library of the first sound patterns includes operations, features, circuitry, logic, means, or instructions, or any combination thereof for identifying each sound in respective subsets of the second sounds, the second sounds including one or more idle periods that correspond to one or more quiet periods between categorical sounds, where the set of categorical sounds includes an idle sound associated with idle periods between categorical sounds; determining, for each sound in the respective subsets of the second sounds, a respective magnitude and a respective categorical sound; identifying, in the second sounds, the sequences of categorical sounds of the set of categorical sounds that repeat a threshold quantity of times; and storing, in the library of the first sound patterns, the sequences of categorical sounds that occur the threshold quantity of times.

Aspect 17: The method, apparatus, or non-transitory computer-readable medium of aspect 16, further including operations, features, circuitry, logic, means, or instructions, or any combination thereof for detecting the second sound patterns, where detecting the second sound patterns includes identifying each sound in respective subsets of third sounds that are extracted from the audio signals captured from the mechanized environment; determining, for each sound in the respective subsets of the third sounds, a respective magnitude and a respective categorical sound; and identifying, in the third sounds, second sequences of categorical sounds of the set of categorical sounds.

Aspect 18: The method, apparatus, or non-transitory computer-readable medium of any of aspects 1 through 17, where generating the library of the first sound patterns and second sound patterns includes operations, features, circuitry, logic, means, or instructions, or any combination thereof for applying an n-gram natural language processing method to the first sounds, second sounds, and third sounds, respectively, to obtain a plurality of n-grams.

Aspect 19: The method, apparatus, or non-transitory computer-readable medium of any of aspects 1 through 18, where the mechanized environment includes a manufacturing environment, an engine environment, a robotic environment, a vehicle environment, a motor environment, or any combination thereof.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 20: An apparatus, including: a processor; and memory storing instructions that are executable by the processor to cause the apparatus to: obtain an audio recording of a mechanized environment: categorize first sounds extracted from the audio recording into a set of categorical sounds: generate, using the set of categorical sounds, a library of first sound patterns based on second sounds that are extracted from the audio recording, the first sound patterns including sequences of categorical sounds of the set of categorical sounds; receive audio data including audio signals captured by one or more sensors in the mechanized environment: compare, based on receiving the audio data, second sound patterns detected in the audio signals with the first sound patterns, and identify, based on comparing the second sound patterns with the first sound patterns, a sound pattern of the second sound patterns that is excluded from the library of the first sound patterns.

Aspect 21: The apparatus of aspect 20, where the instructions are further executable by the processor to cause the apparatus to: extract sounds from the audio recording based on a noise threshold for the mechanized environment, where the audio recording includes a plurality of audio files including the sounds, and where the sounds include the first sounds; and determine, from the sounds extracted from the audio recording, one or more spectral components for the first sounds.

Aspect 22: The apparatus of aspect 21, where the instructions are further executable by the processor to cause the apparatus to: cluster the first sounds into a plurality of clusters based on the one or more spectral components of the first sounds.

Aspect 23: The apparatus of any of aspects 20 through 22, where the instructions are further executable by the processor to cause the apparatus to: identify each sound in respective subsets of the second sounds, the second sounds including an idle period that corresponds to a period between categorical sounds, where the set of categorical sounds includes an idle sound associated with idle periods between categorical sounds; determine, for each sound in the respective subsets of the second sounds, a respective magnitude and a respective categorical sound: identify, in the second sounds, the sequences of categorical sounds of the set of categorical sounds that repeat a threshold quantity of times; and store, in the library of the first sound patterns, the sequences of categorical sounds that occur the threshold quantity of times.

An apparatus is described. The following provides an overview of aspects of the apparatus as described herein:

Aspect 24: A non-transitory, computer-readable medium that stores code that includes instructions executable by a processor of an electronic device to cause the electronic device to: obtain an audio recording of a mechanized environment; categorize first sounds extracted from the audio recording into a set of categorical sounds; generate, using the set of categorical sounds, a library of first sound patterns based on second sounds that are extracted from the audio recording, the first sound patterns including sequences of categorical sounds of the set of categorical sounds: receive audio data including audio signals captured by one or more sensors in the mechanized environment: compare, based on receiving the audio data, second sound patterns detected in the audio signals with the first sound patterns; and identify, based on comparing the second sound patterns with the first sound patterns, a sound pattern of the second sound patterns that is excluded from the library of the first sound patterns.

Aspect 25: The non-transitory, computer-readable medium of aspect 24, where the instructions are further executable by the processor to cause the electronic device to: extract sounds from the audio recording based on a noise threshold for the mechanized environment, where the audio recording includes a plurality of audio files including the sounds, and where the sounds include the first sounds; and determine, from the sounds extracted from the audio recording, one or more spectral components for the first sounds.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a CPU, GPU, or DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

obtaining an audio recording of a mechanized environment;

categorizing first sounds extracted from the audio recording into a set of categorical sounds;

generating, using the set of categorical sounds, a library of first sound patterns based on second sounds that are extracted from the audio recording, the first sound patterns comprising sequences of categorical sounds of the set of categorical sounds;

receiving audio data comprising audio signals captured by one or more sensors in the mechanized environment;

comparing, based on receiving the audio data, second sound patterns detected in the audio signals with the first sound patterns; and identifying, based on comparing the second sound patterns with the first sound patterns, a sound pattern of the second sound patterns that is excluded from the library of the first sound patterns;

wherein the categorizing comprises clustering the first sounds into a plurality of clusters based on one or more spectral components of the first sounds, using an unsupervised clustering procedure based on the audio recording of the mechanized environment; and wherein clustering the first sounds comprises:

applying a one-class support vector machine algorithm to each cluster of the plurality of clusters to filter out a subset of the first sounds identified as noise, wherein a plurality of filtered clusters comprising filtered sounds is obtained based on applying the one-class support vector machine algorithm;

classifying, using a convolutional neural network, the filtered first sounds to obtain a plurality of classifications of the first sounds; and discarding a second subset of the first sounds that are mismatched between the plurality of clusters and the plurality of classifications.

2. The method of claim 1, further comprising:

determining, based on detecting that the sound pattern of the second sound patterns is excluded from the library of the first sound patterns, that the sound pattern of the second sound patterns has occurred a threshold quantity of times; and sending, based on detecting that the sound pattern of the second sound patterns has occurred the threshold quantity of times, an alert to inspect the mechanized environment.

3. The method of claim 2, wherein the threshold quantity of times is based on a length of the sound pattern of the second sound patterns.

4. The method of claim 1, further comprising:

extracting sounds from the audio recording based on a noise threshold for the mechanized environment, wherein the audio recording comprises a plurality of audio files comprising the sounds, and wherein the sounds comprise the first sounds; and determining, from the sounds extracted from the audio recording, one or more spectral components for the first sounds.

5. The method of claim 4, further comprising:

generating a plurality of signal amplitude percentile curves for the plurality of audio files;

identifying, in each of the plurality of signal amplitude percentile curves, a respective elbow feature associated with a respective noise threshold; and generating a second curve that plots respective noise thresholds determined for each audio file in an ascending order.

6. The method of claim 5, further comprising:

identifying, in the second curve, an elbow feature associated with the noise threshold; and determining, based on identifying the elbow feature, the noise threshold, wherein the noise threshold is used for subsequent processing of the audio recording.

7. The method of claim 4, wherein determining the one or more spectral components for the first sounds comprises:

constructing a multi-segment spectrogram for each sound of the first sounds extracted from the audio recording.

8. The method of claim 7, wherein constructing the multi-segment spectrogram for a sound of the first sounds comprises:

computing, for the sound of the first sounds, a mean spectrum within each segment of the multi-segment spectrogram.

9. The method of claim 7, wherein constructing the multi-segment spectrogram for a sound of the first sounds comprises:

determining a first quantity of segments for the sound based on a length of the sound, wherein the multi-segment spectrogram comprises the first quantity of segments and a second quantity of segments;

padding the first quantity of segments, the second quantity of segments, or both, with zeros; and computing, for the sound, a mean spectrum within each segment of the multi-segment spectrogram.

10. The method of claim 1, wherein clustering the sounds further comprises:

calculating a plurality of silhouette scores based on the plurality of clusters including different quantities of clusters; and selecting a quantity for the plurality of clusters associated with a highest silhouette score of the plurality of silhouette scores.

11. The method of claim 1, wherein categorizing the first sounds into the set of categorical sounds comprises:

assigning identifiers of a plurality of identifiers to filtered clusters of the plurality of clusters, wherein the identifiers correspond to categorical sounds of the set of categorical sounds, and wherein respective subsets of the first sounds included in respective filtered clusters are labeled with respective identifiers assigned to the respective filtered clusters to obtain labeled sounds.

12. The method of claim 11, further comprising:

training a convolutional neural network using the labeled sounds to obtain a trained convolutional neural network;

extracting, based on training the convolutional neural network, the second sounds from the audio recording; and inputting the second sounds into the trained convolutional neural network, wherein the second sounds are categorized into the set of categorical sounds based on the second sounds being inputted into the trained convolutional neural network.

13. The method of claim 1, wherein generating the library of the first sound patterns comprises:

identifying each sound in respective subsets of the second sounds, the second sounds comprising one or more idle periods that correspond to one or more quiet periods between categorical sounds, wherein the set of categorical sounds comprises an idle sound associated with idle periods between categorical sounds;

determining, for each sound in the respective subsets of the second sounds, a respective magnitude and a respective categorical sound;

identifying, in the second sounds, the sequences of categorical sounds of the set of categorical sounds that repeat a threshold quantity of times; and storing, in the library of the first sound patterns, the sequences of categorical sounds that occur the threshold quantity of times.

14. The method of claim 13, further comprising:

detecting the second sound patterns, wherein detecting the second sound patterns comprises:

identifying, in third sounds, each sound in respective subsets of the third sounds that are extracted from the audio signals captured from the mechanized environment, determining, for each sound in the respective subsets of the third sounds, the respective magnitude and the respective categorical sound, and identifying, in the third sounds, second sequences of categorical sounds of the set of categorical sounds.

15. The method of claim 1, wherein generating the library of the first sound patterns comprises:

applying an n-gram natural language processing method to the first sounds to obtain a plurality of n-grams.

16. An apparatus, comprising:

one or more processors; and memory storing instructions that are executable by the one or more processors to cause the apparatus to:

obtain an audio recording of a mechanized environment;

categorize first sounds extracted from the audio recording into a set of categorical sounds;

generate, using the set of categorical sounds, a library of first sound patterns based on second sounds that are extracted from the audio recording, the first sound patterns comprising sequences of categorical sounds of the set of categorical sounds;

receive audio data comprising audio signals captured by one or more sensors in the mechanized environment;

compare, based on receiving the audio data, second sound patterns detected in the audio signals with the first sound patterns; and identify, based on comparing the second sound patterns with the first sound patterns, a sound pattern of the second sound patterns that is excluded from the library of the first sound patterns;

wherein the categorizing comprises clustering the first sounds into a plurality of clusters based on one or more spectral components of the first sounds, using an unsupervised clustering procedure; and wherein clustering the first sounds comprises:

applying a one-class support vector machine algorithm to each cluster of the plurality of clusters to filter out a subset of the first sounds identified as noise, wherein a plurality of filtered clusters comprising filtered sounds is obtained based on applying the one-class support vector machine algorithm;

classifying, using a convolutional neural network, the filtered first sounds to obtain a plurality of classifications of the first sounds; and discarding a second subset of the first sounds that are mismatched between the plurality of clusters and the plurality of classifications.

17. The apparatus of claim 16, wherein the instructions are further executable by the one or more processors to cause the apparatus to:

determine, based on detecting that the sound pattern of the second sound patterns is excluded from the library of the first sound patterns, that the sound pattern of the second sound patterns has occurred a threshold quantity of times; and send, based on detecting that the sound pattern of the second sound patterns has occurred the threshold quantity of times, an alert to inspect the mechanized environment.

18. The apparatus of claim 16, wherein the instructions are further executable by the one or more processors to cause the apparatus to:

extract sounds from the audio recording based on a noise threshold for the mechanized environment, wherein the audio recording comprises a plurality of audio files comprising the sounds, and wherein the sounds comprise the first sounds; and determine, from the sounds extracted from the audio recording, one or more spectral components for the first sounds.

19. The apparatus of claim 16, wherein the instructions are further executable by the one or more processors to cause the apparatus to:

calculate a plurality of silhouette scores based on the plurality of clusters including different quantities of clusters; and select a quantity for the plurality of clusters associated with a highest silhouette score of the plurality of silhouette scores.

20. A non-transitory, computer-readable medium that stores code that comprises instructions executable by a processor of an electronic device to cause the electronic device to:

obtain an audio recording of a mechanized environment;

categorize first sounds extracted from the audio recording into a set of categorical sounds;

generate, using the set of categorical sounds, a library of first sound patterns based on second sounds that are extracted from the audio recording, the first sound patterns comprising sequences of categorical sounds of the set of categorical sounds;

receive audio data comprising audio signals captured by one or more sensors in the mechanized environment;

compare, based on receiving the audio data, second sound patterns detected in the audio signals with the first sound patterns; and identify, based on comparing the second sound patterns with the first sound patterns, a sound pattern of the second sound patterns that is excluded from the library of the first sound patterns;

wherein the categorizing comprises clustering the first sounds into a plurality of clusters based on one or more spectral components of the first sounds, using an unsupervised clustering procedure; and wherein clustering the first sounds comprises:

applying a one-class support vector machine algorithm to each cluster of the plurality of clusters to filter out a subset of the first sounds identified as noise, wherein a plurality of filtered clusters comprising filtered sounds is obtained based on applying the one-class support vector machine algorithm;

classifying, using a convolutional neural network, the filtered first sounds to obtain a plurality of classifications of the first sounds; and discarding a second subset of the first sounds that are mismatched between the plurality of clusters and the plurality of classifications.

* * * * *